(12) United States Patent
Charbonneau et al.

(10) Patent No.: US 12,168,475 B2
(45) Date of Patent: Dec. 17, 2024

(54) IMPACT FEATURES

(71) Applicant: Canoo Technologies Inc., Torrance, CA (US)

(72) Inventors: Alexi Charbonneau, Redondo Beach, CA (US); Naesung Lyu, Torrance, CA (US); Mahesh Chinchani, Torrance, CA (US); Salman Khan, Torrance, CA (US); Yufeng Long, Rancho Palos Verdes, CA (US); Morteza Kiani, Troy, MI (US); Daniel McCarron, Torrance, CA (US); William Rohr, Rancho Palos Verdes, CA (US); Aniruddha Ranade, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 322 days.

(21) Appl. No.: 17/646,656

(22) Filed: Dec. 30, 2021

(65) Prior Publication Data

US 2022/0126922 A1  Apr. 28, 2022

Related U.S. Application Data

(63) Continuation of application No. 16/920,375, filed on Jul. 2, 2020, now Pat. No. 11,318,995.

(Continued)

(51) Int. Cl.
*B62D 21/15* (2006.01)
*B62D 25/08* (2006.01)
(Continued)

(52) U.S. Cl.
CPC ........ *B62D 21/152* (2013.01); *B62D 21/157* (2013.01); *B62D 25/08* (2013.01);
(Continued)

(58) Field of Classification Search
CPC .. B62D 21/152; B62D 21/157; B62D 25/025; B62D 25/085; B62D 25/2018;
(Continued)

(56) References Cited

U.S. PATENT DOCUMENTS

| | | |
|---|---|---|
| 1,526,481 A | 2/1925 | Krieger |
| 2,467,516 A | 4/1949 | Almdale |

(Continued)

FOREIGN PATENT DOCUMENTS

| | | |
|---|---|---|
| AU | 2002323246 A1 | 3/2003 |
| AU | 2002332561 A1 | 3/2003 |

(Continued)

OTHER PUBLICATIONS

Text KR101286675 (Year: 2013).*

(Continued)

*Primary Examiner* — Dennis H Pedder

(57) ABSTRACT

A vehicle platform with a variety of impact safety features including front and rear impact features as well as side impact features designed to protect the passenger compartment as well as the battery compartment and vehicle chassis components. Some features may include crumple zone components, deflectors and modular energy absorption units.

18 Claims, 24 Drawing Sheets

Related U.S. Application Data

(60) Provisional application No. 62/869,823, filed on Jul. 2, 2019.

(51) Int. Cl.
    *B62D 27/02*     (2006.01)
    *B62D 27/06*     (2006.01)
    *B60K 1/02*     (2006.01)
    *B60K 1/04*     (2019.01)

(52) U.S. Cl.
    CPC ......... *B62D 27/023* (2013.01); *B62D 27/065* (2013.01); *B60K 1/02* (2013.01); *B60K 2001/0438* (2013.01)

(58) Field of Classification Search
    CPC ............ B62D 25/2027; B62D 25/2036; B62D 27/065; B60Y 2306/01
    USPC ... 296/187.09, 187.1, 187.12, 187.11, 29, 30
    See application file for complete search history.

(56) References Cited

U.S. PATENT DOCUMENTS

| | | |
|---|---|---|
| 2,673,512 A | 3/1954 | Henney |
| 2,873,994 A | 2/1959 | Omps |
| 3,170,682 A | 2/1965 | Eggers |
| 3,429,566 A | 2/1969 | Rosendale |
| 3,951,450 A | 4/1976 | Gambotti |
| 4,148,505 A | 4/1979 | Jensen et al. |
| 4,307,865 A | 12/1981 | MacCready |
| 4,458,918 A | 7/1984 | Rumpel |
| 4,460,215 A | 7/1984 | Chamberlain et al. |
| 4,527,828 A | 7/1985 | Groce et al. |
| 4,541,654 A | 9/1985 | Jonasson |
| 4,557,500 A | 12/1985 | Collard et al. |
| 4,619,466 A | 10/1986 | Schaible et al. |
| 4,779,917 A | 10/1988 | Campbell et al. |
| 4,799,632 A | 1/1989 | Baymak et al. |
| 4,887,841 A | 12/1989 | Cowburn et al. |
| 5,015,545 A | 5/1991 | Brooks |
| 5,039,124 A | 8/1991 | Widmer |
| 5,069,306 A | 12/1991 | Inoue et al. |
| 5,141,209 A | 8/1992 | Sano et al. |
| 5,501,289 A | 3/1996 | Nishikawa et al. |
| 5,807,205 A | 9/1998 | Odaka et al. |
| 5,827,149 A | 10/1998 | Sponable |
| 6,029,987 A | 2/2000 | Hoffman et al. |
| 6,299,210 B1 | 10/2001 | Ruehl et al. |
| 6,488,791 B1 | 12/2002 | Powers, II |
| 6,512,347 B1 | 1/2003 | Hellmann et al. |
| 6,672,662 B1 | 1/2004 | Balk |
| 6,688,586 B1 | 2/2004 | Moore |
| 6,705,668 B1 | 3/2004 | Makita et al. |
| 6,710,916 B1 | 3/2004 | Bolshtyansky |
| 6,712,164 B2 | 3/2004 | Chernoff et al. |
| 6,726,438 B2 | 4/2004 | Chernoff et al. |
| 6,733,040 B1 | 5/2004 | Simboli |
| 6,766,873 B2 | 7/2004 | Chernoff et al. |
| 6,768,932 B2 | 7/2004 | Claypole et al. |
| 6,811,169 B2 | 11/2004 | Schroeder et al. |
| 6,830,117 B2 | 12/2004 | Chernoff et al. |
| 6,836,943 B2 | 1/2005 | Chernoff et al. |
| 6,843,336 B2 | 1/2005 | Chernoff et al. |
| 6,845,839 B2 | 1/2005 | Chernoff et al. |
| 6,857,498 B2 | 2/2005 | Vitale et al. |
| 6,880,856 B2 | 4/2005 | Chernoff et al. |
| 6,889,785 B2 | 5/2005 | Chernoff et al. |
| 6,899,194 B2 | 5/2005 | Chernoff et al. |
| 6,905,138 B2 | 6/2005 | Borroni-Bird et al. |
| 6,923,281 B2 | 8/2005 | Chernoff et al. |
| 6,923,282 B2 | 8/2005 | Chernoff et al. |
| 6,935,449 B2 | 8/2005 | Chernoff et al. |
| 6,935,658 B2 | 8/2005 | Chernoff et al. |
| 6,938,712 B2 | 9/2005 | Chernoff et al. |
| 6,948,226 B2 | 9/2005 | Chernoff et al. |
| 6,959,475 B2 | 11/2005 | Chernoff et al. |
| 6,968,918 B2 | 11/2005 | Chernoff et al. |
| 6,976,307 B2 | 12/2005 | Chernoff et al. |
| 6,986,401 B2 | 1/2006 | Chernoff et al. |
| 6,991,060 B2 | 1/2006 | Chernoff et al. |
| 7,000,318 B2 | 2/2006 | Chernoff et al. |
| 7,004,502 B2 | 2/2006 | Borroni-Bird et al. |
| 7,025,409 B2 | 4/2006 | Riley et al. |
| 7,028,791 B2 | 4/2006 | Chernoff et al. |
| 7,029,017 B2 | 4/2006 | Zandbergen et al. |
| 7,036,848 B2 | 5/2006 | Chernoff et al. |
| 7,083,016 B2 | 8/2006 | Chernoff et al. |
| 7,096,986 B2 | 8/2006 | Borroni-Bird et al. |
| 7,104,581 B2 | 9/2006 | Chernoff et al. |
| 7,111,900 B2 | 9/2006 | Chernoff et al. |
| 7,213,673 B2 | 5/2007 | Shabana et al. |
| 7,237,829 B2 * | 7/2007 | Latimer, III ....... B62D 25/2036 296/187.11 |
| 7,275,609 B2 | 10/2007 | Chernoff et al. |
| 7,281,600 B2 | 10/2007 | Chernoff et al. |
| 7,292,992 B2 | 11/2007 | Chernoff et al. |
| 7,303,033 B2 | 12/2007 | Chernoff et al. |
| 7,303,211 B2 | 12/2007 | Borroni-Bird et al. |
| 7,360,816 B2 | 4/2008 | Chernoff et al. |
| 7,370,886 B2 | 5/2008 | Luttinen et al. |
| 7,373,315 B2 | 5/2008 | Chernoff et al. |
| 7,398,846 B2 | 7/2008 | Young et al. |
| 7,441,615 B2 | 10/2008 | Borroni-Bird et al. |
| 7,469,956 B2 | 12/2008 | Yasuhara et al. |
| 7,520,355 B2 | 4/2009 | Chaney |
| 7,597,169 B2 | 10/2009 | Borroni-Bird et al. |
| 7,681,943 B2 | 3/2010 | Murata et al. |
| 7,753,428 B2 | 7/2010 | Kato et al. |
| 7,936,113 B2 | 5/2011 | Namuduri et al. |
| 8,143,766 B2 | 3/2012 | Namuduri et al. |
| 8,253,281 B2 | 8/2012 | Namuduri et al. |
| 8,308,148 B2 | 11/2012 | Shand |
| 8,448,696 B2 | 5/2013 | Johnston et al. |
| 8,484,930 B2 | 7/2013 | Ruehl |
| 8,485,543 B2 | 7/2013 | Richardson et al. |
| 8,556,282 B2 | 10/2013 | Pollmeyer et al. |
| 8,640,806 B2 | 2/2014 | Worup et al. |
| 8,708,392 B2 | 4/2014 | Otsuka et al. |
| 8,757,719 B2 | 6/2014 | Hayakawa |
| 8,881,883 B2 | 11/2014 | Barton et al. |
| 8,936,265 B2 | 1/2015 | Ehrlich et al. |
| 8,940,425 B2 | 1/2015 | Toepfer |
| 8,998,296 B2 | 4/2015 | Eipper |
| 9,162,546 B2 | 10/2015 | Girelli Consolaro et al. |
| 9,457,746 B1 | 10/2016 | Baccouche et al. |
| 9,566,840 B2 | 2/2017 | Seethaler et al. |
| 9,580,176 B2 | 2/2017 | Ehlers et al. |
| 9,627,721 B2 | 4/2017 | Kosaki et al. |
| 9,676,418 B1 | 6/2017 | Mohammed et al. |
| 9,682,727 B2 | 6/2017 | Tanaka et al. |
| 9,751,565 B2 | 9/2017 | Tatsuwaki et al. |
| 9,988,100 B2 | 6/2018 | Kim et al. |
| 10,131,381 B2 | 11/2018 | Ashraf et al. |
| 10,293,860 B1 | 5/2019 | Cooper et al. |
| 10,336,369 B2 | 7/2019 | Viaux et al. |
| 10,421,424 B2 * | 9/2019 | Sabu ..................... B60R 19/34 |
| 10,486,513 B2 | 11/2019 | Battaglia et al. |
| 10,632,857 B2 | 4/2020 | Matecki et al. |
| 10,741,809 B2 | 8/2020 | Kim et al. |
| 2002/0149490 A1 | 10/2002 | Butler et al. |
| 2003/0037427 A1 | 2/2003 | Chernoff et al. |
| 2003/0037967 A1 | 2/2003 | Chernoff et al. |
| 2003/0037968 A1 | 2/2003 | Chernoff et al. |
| 2003/0037970 A1 | 2/2003 | Chernoff et al. |
| 2003/0037971 A1 | 2/2003 | Chernoff et al. |
| 2003/0037972 A1 | 2/2003 | Chernoff et al. |
| 2003/0037973 A1 | 2/2003 | Chernoff et al. |
| 2003/0037974 A1 | 2/2003 | Chernoff et al. |
| 2003/0037975 A1 | 2/2003 | Chernoff et al. |
| 2003/0037982 A1 | 2/2003 | Chernoff et al. |
| 2003/0037987 A1 | 2/2003 | Chernoff et al. |
| 2003/0038442 A1 | 2/2003 | Chernoff et al. |
| 2003/0038467 A1 | 2/2003 | Chernoff et al. |

(56) References Cited

U.S. PATENT DOCUMENTS

| | | |
|---|---|---|
| 2003/0038468 A1 | 2/2003 | Chernoff et al. |
| 2003/0038469 A1 | 2/2003 | Chernoff et al. |
| 2003/0038470 A1 | 2/2003 | Chernoff et al. |
| 2003/0038509 A1 | 2/2003 | Chernoff et al. |
| 2003/0040827 A1 | 2/2003 | Chernoff et al. |
| 2003/0040828 A1 | 2/2003 | Chernoff et al. |
| 2003/0040933 A1 | 2/2003 | Chernoff et al. |
| 2003/0040977 A1 | 2/2003 | Chernoff et al. |
| 2003/0040979 A1 | 2/2003 | Borroni-Bird et al. |
| 2003/0046802 A1 | 3/2003 | Chernoff et al. |
| 2003/0047362 A1 | 3/2003 | Chernoff et al. |
| 2003/0080577 A1 | 5/2003 | Roberts et al. |
| 2003/0089536 A1 | 5/2003 | Chernoff et al. |
| 2003/0094318 A1 | 5/2003 | Chernoff et al. |
| 2003/0094319 A1 | 5/2003 | Chernoff et al. |
| 2003/0094320 A1 | 5/2003 | Chernoff et al. |
| 2003/0116374 A1 | 6/2003 | Chernoff et al. |
| 2003/0141736 A1 | 7/2003 | Chernoff et al. |
| 2003/0159866 A1 | 8/2003 | Claypole et al. |
| 2003/0164255 A1 | 9/2003 | Borroni-Bird et al. |
| 2003/0168267 A1 | 9/2003 | Borroni-Bird et al. |
| 2003/0168844 A1 | 9/2003 | Borroni-Bird et al. |
| 2003/0184075 A1 | 10/2003 | Freeman et al. |
| 2004/0060750 A1 | 4/2004 | Chernoff et al. |
| 2004/0066025 A1 | 4/2004 | Borroni-Bird et al. |
| 2004/0069545 A1 | 4/2004 | Chernoff et al. |
| 2004/0069556 A1 | 4/2004 | Chernoff et al. |
| 2004/0129487 A1 | 7/2004 | Shabana et al. |
| 2004/0163859 A1 | 8/2004 | Chernoff et al. |
| 2004/0163875 A1 | 8/2004 | Chernoff et al. |
| 2004/0164577 A1 | 8/2004 | Shabana et al. |
| 2004/0189054 A1 | 9/2004 | Chernoff et al. |
| 2004/0194280 A1 | 10/2004 | Borroni-Bird et al. |
| 2004/0194313 A1 | 10/2004 | Chernoff et al. |
| 2004/0195014 A1 | 10/2004 | Chernoff et al. |
| 2005/0049944 A1 | 3/2005 | Chernoff et al. |
| 2005/0082872 A1 | 4/2005 | Rich et al. |
| 2005/0121926 A1 | 6/2005 | Montanvert et al. |
| 2005/0161981 A1 | 7/2005 | Chernoff et al. |
| 2005/0168016 A1 | 8/2005 | Svartvatn |
| 2005/0263332 A1 | 12/2005 | Chernoff et al. |
| 2006/0027406 A1 | 2/2006 | Borroni-Bird et al. |
| 2006/0048994 A1 | 3/2006 | Young et al. |
| 2006/0061080 A1 | 3/2006 | Luttinen et al. |
| 2006/0102398 A1 | 5/2006 | Mizuno |
| 2007/0222251 A1 | 9/2007 | Abraham |
| 2008/0169671 A1 | 7/2008 | Hedderly |
| 2009/0058134 A1 | 3/2009 | Hiraishi et al. |
| 2009/0236877 A1 | 9/2009 | Peschansky et al. |
| 2010/0025131 A1 | 2/2010 | Gloceri et al. |
| 2010/0219720 A1 | 9/2010 | Namuduri et al. |
| 2010/0219721 A1 | 9/2010 | Namuduri et al. |
| 2010/0219798 A1 | 9/2010 | Namuduri et al. |
| 2010/0242513 A1 | 9/2010 | Nishino et al. |
| 2010/0273411 A1 | 10/2010 | Kakizaki et al. |
| 2010/0314905 A1 | 12/2010 | Mori |
| 2011/0212355 A1 | 9/2011 | Essinger et al. |
| 2011/0259657 A1 | 10/2011 | Fuechtner |
| 2011/0296855 A1 | 12/2011 | Johnston et al. |
| 2012/0049664 A1 | 3/2012 | Yokoyama et al. |
| 2012/0169089 A1 | 7/2012 | Rawlinson et al. |
| 2012/0174602 A1 | 7/2012 | Olivier et al. |
| 2012/0175899 A1 | 7/2012 | Gadhiya et al. |
| 2012/0183815 A1 | 7/2012 | Johnston et al. |
| 2013/0088045 A1 | 4/2013 | Charbonneau et al. |
| 2013/0300138 A1 | 11/2013 | Banasiak et al. |
| 2013/0341882 A1 | 12/2013 | Ehrlich et al. |
| 2014/0308551 A1 | 10/2014 | Schroeder et al. |
| 2014/0353937 A1 | 12/2014 | Girelli Consolaro et al. |
| 2015/0142245 A1 | 5/2015 | Cuddihy et al. |
| 2015/0258955 A1 | 9/2015 | Jayasuriya et al. |
| 2015/0298741 A1 | 10/2015 | Winberg et al. |
| 2016/0003553 A1 | 1/2016 | Campbell |
| 2016/0023532 A1 | 1/2016 | Gauthier |
| 2016/0107501 A1 | 4/2016 | Johnston |
| 2016/0107506 A1 | 4/2016 | Johnston |
| 2016/0164055 A1 | 6/2016 | Saitou |
| 2016/0207370 A1 | 7/2016 | Moeller et al. |
| 2016/0318409 A1 | 11/2016 | Rawlinson |
| 2017/0001507 A1 | 1/2017 | Ashraf et al. |
| 2017/0001667 A1 | 1/2017 | Ashraf et al. |
| 2017/0057546 A1* | 3/2017 | Dressel ............... B62D 21/152 |
| 2017/0225588 A1 | 8/2017 | Newman |
| 2017/0225714 A1 | 8/2017 | Ito |
| 2017/0305248 A1 | 10/2017 | Hara et al. |
| 2017/0369112 A1 | 12/2017 | Ashraf et al. |
| 2018/0050606 A1 | 2/2018 | Sugitate et al. |
| 2018/0050607 A1 | 2/2018 | Matecki et al. |
| 2018/0065678 A1 | 3/2018 | Tutzer |
| 2018/0072131 A1 | 3/2018 | Lee et al. |
| 2018/0086224 A1 | 3/2018 | King |
| 2018/0097265 A1 | 4/2018 | Tarlau et al. |
| 2018/0105062 A1 | 4/2018 | Fees et al. |
| 2018/0108891 A1 | 4/2018 | Fees et al. |
| 2018/0215245 A1 | 8/2018 | Sudhindra et al. |
| 2018/0229628 A1 | 8/2018 | Minato et al. |
| 2018/0261899 A1 | 9/2018 | Milton et al. |
| 2018/0337377 A1 | 11/2018 | Stephens et al. |
| 2018/0337378 A1 | 11/2018 | Stephens et al. |
| 2018/0361819 A1 | 12/2018 | Ryu et al. |
| 2019/0023321 A1 | 1/2019 | Ayukawa |
| 2019/0054956 A1 | 2/2019 | Stenvall |
| 2019/0070924 A1 | 3/2019 | Mancini et al. |
| 2019/0092113 A1 | 3/2019 | Girelli Consolaro et al. |
| 2019/0131602 A1 | 5/2019 | Hilfrich et al. |
| 2019/0135065 A1 | 5/2019 | Wolf-Monheim |
| 2019/0160903 A1 | 5/2019 | Schramm et al. |
| 2019/0210470 A1 | 7/2019 | Thomas et al. |
| 2019/0225051 A1 | 7/2019 | Zenner et al. |
| 2019/0308669 A1 | 10/2019 | Aitharaju et al. |
| 2020/0079177 A1 | 3/2020 | Ferraris et al. |
| 2020/0079431 A1 | 3/2020 | Stainer et al. |
| 2020/0114973 A1 | 4/2020 | Takahashi et al. |
| 2020/0152926 A1 | 5/2020 | Wynn et al. |
| 2020/0156486 A1 | 5/2020 | Howard et al. |
| 2020/0215943 A1 | 7/2020 | Hayashi |
| 2020/0231218 A1 | 7/2020 | Arvidsson et al. |
| 2020/0339197 A1 | 10/2020 | Kecalevic et al. |
| 2020/0369140 A1 | 11/2020 | McCarron et al. |
| 2020/0398732 A1 | 12/2020 | Glatfelter et al. |
| 2021/0001924 A1 | 1/2021 | Charbonneau et al. |
| 2021/0091352 A1 | 3/2021 | Weicker et al. |
| 2021/0122223 A1 | 4/2021 | McCarron et al. |
| 2021/0273285 A1 | 9/2021 | Bluemel |
| 2022/0123397 A1 | 4/2022 | Weicker et al. |
| 2022/0234435 A1 | 7/2022 | McCarron et al. |
| 2023/0102921 A1 | 3/2023 | Odhekar et al. |

FOREIGN PATENT DOCUMENTS

| | | |
|---|---|---|
| CN | 1675092 A | 9/2005 |
| CN | 1695050 A | 11/2005 |
| CN | 1791519 A | 6/2006 |
| CN | 100379612 C | 4/2008 |
| CN | 201217453 Y | 4/2009 |
| CN | 102275521 A | 12/2011 |
| CN | 102548780 A | 7/2012 |
| CN | 103183053 B | 7/2013 |
| CN | 204150116 U | 2/2015 |
| CN | 104417303 A | 3/2015 |
| CN | 105522888 A | 4/2016 |
| CN | 106240637 A | 12/2016 |
| CN | 106458123 A | 2/2017 |
| CN | 205916190 U | 2/2017 |
| CN | 106573651 A | 4/2017 |
| CN | 206287960 U | 6/2017 |
| CN | 107074051 A | 8/2017 |
| CN | 206417059 U | 8/2017 |
| CN | 107651021 A | 2/2018 |
| CN | 107709074 A | 2/2018 |
| CN | 107792185 A | 3/2018 |
| CN | 107813674 A | 3/2018 |
| CN | 108357565 A | 8/2018 |
| CN | 108860040 A | 11/2018 |

(56) References Cited

FOREIGN PATENT DOCUMENTS

| | | | |
|---|---|---|---|
| CN | 108891248 A | 11/2018 | |
| CN | 208069806 U | 11/2018 | |
| CN | 109204462 A | 1/2019 | |
| CN | 109291747 A | 2/2019 | |
| CN | 110053451 A | 7/2019 | |
| CN | 210149098 U | 3/2020 | |
| DE | 3430129 A1 | 2/1986 | |
| DE | 10154353 A1 | 5/2002 | |
| DE | 10297137 T5 | 8/2004 | |
| DE | 102006021149 A1 | 11/2007 | |
| DE | 102008052937 A1 | 5/2009 | |
| DE | 10297133 B4 | 5/2013 | |
| DE | 102017005938 B3 | 12/2018 | |
| DE | 102018123357 A1 | 3/2019 | |
| DE | 102018122854 A1 | 3/2020 | |
| DE | 102020101867 A1 | 7/2020 | |
| EP | 0770517 A1 | 5/1997 | |
| EP | 0857590 A1 | 8/1998 | |
| EP | 1245436 A1 | 10/2002 | |
| EP | 1446645 A2 | 8/2004 | |
| EP | 1448969 A1 | 8/2004 | |
| EP | 2392486 A2 | 12/2011 | |
| EP | 3088230 A1 | 11/2016 | |
| FR | 8239 E | 2/1908 | |
| FR | 2821046 A1 | 8/2002 | |
| FR | 2938475 A1 | 5/2010 | |
| FR | 2972169 A1 | 9/2012 | |
| GB | 191217101 A | 6/1913 | |
| GB | 2568538 A | 5/2019 | |
| JP | S63-151515 A | 6/1988 | |
| JP | H01-158206 U | 11/1989 | |
| JP | H03-91867 U | 9/1991 | |
| JP | H04-83926 U | 7/1992 | |
| JP | H05-19010 U | 3/1993 | |
| JP | H11-78966 A | 3/1999 | |
| JP | H11-348815 A | 12/1999 | |
| JP | 2001-47828 A | 2/2001 | |
| JP | 2001-047828 A | 2/2001 | |
| JP | 2002-229656 A | 8/2002 | |
| JP | 2002-370544 A | 12/2002 | |
| JP | 2004-338421 A | 12/2004 | |
| JP | 2005500940 A | 1/2005 | |
| JP | 2007-106320 A | 4/2007 | |
| JP | 2007-303680 A | 11/2007 | |
| JP | 2008-512627 A | 4/2008 | |
| JP | 2008149914 A | 7/2008 | |
| JP | 2010-221991 A | 10/2010 | |
| JP | 4840196 B2 | 12/2011 | |
| JP | 2013-136308 A | 7/2013 | |
| JP | 2014-127338 A | 7/2014 | |
| JP | 2015-074244 A | 4/2015 | |
| JP | 2017001441 A | 1/2017 | |
| KR | 10-2003-0046824 A | 6/2003 | |
| KR | 101286675 B1 * | 7/2013 | |
| WO | 199104875 A1 | 4/1991 | |
| WO | 03018337 A2 | 3/2003 | |
| WO | 03018358 A2 | 3/2003 | |
| WO | 03018359 A2 | 3/2003 | |
| WO | 03018373 A1 | 3/2003 | |
| WO | 03019309 A1 | 3/2003 | |
| WO | 03050498 A1 | 6/2003 | |
| WO | 03054500 A2 | 7/2003 | |
| WO | 2005084985 A1 | 9/2005 | |
| WO | 2006029415 A2 | 3/2006 | |
| WO | 2011134815 A1 | 11/2011 | |
| WO | 2014173516 A1 | 10/2014 | |
| WO | 2015128430 A1 | 9/2015 | |
| WO | WO-2015136476 A1 * | 9/2015 | ............ B60R 19/18 |
| WO | 2015151064 A1 | 10/2015 | |
| WO | 2017136351 A2 | 8/2017 | |
| WO | 2017207125 A1 | 12/2017 | |
| WO | 2017215857 A1 | 12/2017 | |
| WO | 2018149762 A1 | 8/2018 | |
| WO | 2018158363 A1 | 9/2018 | |
| WO | 2019169080 A1 | 9/2019 | |
| WO | 2020236913 A1 | 11/2020 | |

OTHER PUBLICATIONS

Text WO2115136476 (Year: 2015).*
Office Action dated Feb. 13, 2023 in connection with Canadian Patent Application No. 3,145,383, 4 pages.
Notice of Reasons for Refusal dated Mar. 14, 2023 in connection with Japanese Patent Application No. 2021-568853, 4 pages.
Non-Final Office Action dated Mar. 24, 2023 in connection with U.S. Appl. No. 18/052,460, 8 pages.
Supplementary European Search Report dated Dec. 5, 2023, in connection with European Application No. 20864821.2, 13 pages.
Office Action dated Nov. 2, 2023, in connection with Canadian Application No. 3,155,162, 7 pages.
Non-final Office Action dated Dec. 20, 2023, in connection with U.S. Appl. No. 17/646,653, 14 pages.
Notification of the First Office Action dated Dec. 7, 2023, in connection with Chinese Application No. 202080079746.X, 16 pages.
Decision to Grant a Patent dated Jun. 20, 2023, in connection with Japanese Application No. 2021-568853, 6 pages.
Notice of Allowance dated Jul. 6, 2023, in connection with U.S. Appl. No. 16/879,235, 10 pages.
Office Action dated Aug. 10, 2023, in connection with Canadian Application No. 3,163,502, 3 pages.
Office Action dated Aug. 15, 2023, in connection with Canadian Application No. 3,163,499, 6 pages.
Notification of the First Office Action dated Aug. 16, 2023, in connection with Chinese Patent Application No. 202080080584.1, 20 pages.
Supplementary Partial European Search Report dated Sep. 11, 2023, in connection with European Application No. 20864821.2, 14 pages.
Supplementary Partial European Search Report dated Sep. 19, 2023, in connection with European Application No. 20865142.2, 17 pages.
Communication pursuant to Article 94(3) EPC dated Feb. 21, 2024, in connection with European Application No. 20920386.8, 10 pages.
Notice of review opinion dated Jan. 11, 2024, in connection with Taiwanese Application No. 11320040860, 16 pages.
Supplementary European Search Report dated Jan. 16, 2024, in connection with European Application No. 20865142.2, 16 pages.
Final Office Action dated Aug. 4, 2022, in connection with U.S. Appl. No. 16/879,235, 12 pages.
Non-final Office Action dated Jun. 7, 2022, in connection with U.S. Appl. No. 16/879,235, 14 pages.
Decision of Refusal dated May 9, 2023, in connection with Japanese Application No. 2021-577866, 9 pages.
Invitation pursuant to Rule 63(1) EPC dated May 12, 2023, in connection with European Application No. 20809867.3, 7 pages.
Supplemental European Search Report dated Nov. 8, 2023, in connection with European Application No. 20863787.6, 10 pages.
Supplemental European Search Report dated Nov. 8, 2023, in connection with European Application No. 20865403.8, 13 pages.
Commissioners Notice—Application Found Allowable dated Feb. 19, 2024, in connection with Canadian Application No. 3,145,383, 1 page.
Commissioners Notice—Application Found Allowable dated Feb. 8, 2024, in connection with Canadian Application No. 3,153,952, 1 page.
Notification of Second Office Action dated Mar. 5, 2024, in connection with Chinese Application No. 202080073120.8, 6 pages.
International Search Report and Written Opinion of the International Searching Authority dated Mar. 8, 2024, in connection with International Application No. PCT/US2023/080393, 9 pages.
Final Office Action dated Mar. 12, 2024, in connection with U.S. Appl. No. 17/646,653, 17 pages.

(56) References Cited

OTHER PUBLICATIONS

Commissioner's Notice—Application Found Allowable dated Feb. 12, 2024, in connection with Canadian Application No. 3,163,499, 1 page.
Notification of the First Office Action dated Aug. 29, 2023, in connection with Chinese Patent Application No. 202080052476.3, 20 pages.
Notification of the First Office Action dated Sep. 1, 2023, in connection with Chinese Patent Application No. 202080073120.8, 17 pages.
Notification of the First Office Action dated Aug. 30, 2023, in connection with Chinese Patent Application No. 202080048116.6, 20 pages.
Notice of Allowance dated Sep. 12, 2023, in connection with Canadian Application No. 3,141,572, 1 page.
Non-final Office Action dated Sep. 14, 2022, in connection with U.S. Appl. No. 17/016,299, 14 pages.
Notice of Allowance dated Nov. 7, 2022, in connection with U.S. Appl. No. 17/016,299, 5 pages.
Notice of Allowance dated Oct. 31, 2022, in connection with U.S. Appl. No. 17/027,600, 7 pages.
Non-final Office Action dated Oct. 7, 2022, in connection with U.S. Appl. No. 17/027,600, 7 pages.
Non-final Office Action dated Oct. 20, 2022, in connection with U.S. Appl. No. 16/879,235, 11 pages.
Notice of Reasons for Refusal dated Nov. 22, 2022, in connection with Japanese Application No. 2021-568853, 12 pages.
Office Action dated Apr. 12, 2023, in connection with Canadian Application No. 3,153,952, 3 pages.
International Search Report and Written Opinion for International Application No. PCT/US2020/050013, Search completed Nov. 4, 2020, mailed Nov. 30, 2020, 10 pages.
International Search Report and Written Opinion for International Application No. PCT/US2020/051870, Search completed Jan. 6, 2021, mailed Feb. 4, 2021, 13 pages.
International Search Report and Written Opinion for International Application No. PCT/US2020/051505, completed Jan. 12, 2021, mailed Feb. 5, 2021, 12 pages.
International Search Report and Written Opinion for International Application No. PCT/US2020/033769, Completed Jul. 15, 2020, mailed Sep. 2, 2020, 30 pages.
International Search Report and Written Opinion for International Application No. PCT/US2020/051879, Search completed Nov. 24, 2020, mailed Dec. 14, 2020, 8 pages.
International Search Report and Written Opinion for International Application No. PCT/US2020/040788, Search completed Nov. 19, 2020, mailed Dec. 22, 2020, 14 pages.
Non-final Office Action for U.S. Appl. No. 17/027,626, dated Jul. 20, 2021, 20 pages.
Notice of Allowance for U.S. Appl. No. 17/142,889, dated Jul. 1, 2021, 7 pages.
Notice of Allowance for U.S. Appl. No. 17/027,626, dated Sep. 28, 2021, 7 pages.
Corrected Notice of Allowability for U.S. Appl. No. 17/027,626, dated Jan. 18, 2022, 7 pages.
Notice of Allowance for U.S. Appl. No. 16/920,375, dated Dec. 17, 2021, 9 pages.
Notice of Allowance for U.S. Appl. No. 17/491,217, dated Nov. 29, 2021, 10 pages.
Cropley, Steve, "Williams reveals electric vehicle skateboard chassis," Autocar Industry News, Haymarket Media Group, Sep. 6, 2017, 5 pages.
Office Action dated Jan. 12, 2023 in connection with Canadian Patent Application No. 3,141,572, 3 pages.
Supplementary European Search Report dated Dec. 9, 2022 in connection with European Patent Application No. 20920386.8, 27 pages.
Notice of Reasons for Refusal dated Dec. 13, 2022 in connection with Japanese Patent Application No. 2021-577866, 16 pages.
Final Office Action dated Feb. 1, 2023 in connection with U.S. Appl. No. 16/879,235, 12 pages.
Supplementary European Search Report dated Jul. 24, 2023, in connection with European Patent Application No. 20809867.3, 24 pages.
Decision to Grant a Patent dated Aug. 15, 2023, in connection with Japanese Application No. 2021-577866, 5 pages.
Notification of the Second Office Action dated Jan. 18, 2024, in connection with Chinese Application No. 202080048116.6, 14 pages.
Notice of Allowance dated Apr. 22, 2024, in connection with U.S. Appl. No. 17/651,221, 10 pages.
Notice of Reasons for Refusal dated Jun. 25, 2024, in connection with Japanese Application No. 2023-101515, 9 pages.
Notice of Allowance dated Jun. 19, 2024, in connection with Taiwanese Application No. 109116751, 3 pages.
Application Found Allowable dated May 24, 2024, in connection with Canadian Application No. 3,155,162, 1 page.
Rejection Decision dated May 27, 2024, in connection with Chinese Application No. 202080048116.6, 12 pages.
Notification to Grant Patent Right for Invention dated Jun. 10, 2024, in connection with Chinese Application No. 202080079746.X, 4 pages.
Notification to Grant Patent Right for Invention dated Jun. 20, 2024, in connection with Chinese Application No. 202080080584.1, 6 pages.
Notice of Reasons for Rejection dated Aug. 6, 2024, in connection with Japanese Application No. 2023-114857, 11 pages.
Third Office Action dated Jul. 25, 2024, in connection with Chinese Application No. CN202080073120.8, 23 pages.
Non-final Office Action dated Sep. 9, 2024, in connection with U.S. Appl. No. 17/761,997, 17 pages.
Non-final Office Action dated Jul. 17, 2024, in connection with U.S. Appl. No. 17/646,653, 15 pages.

* cited by examiner

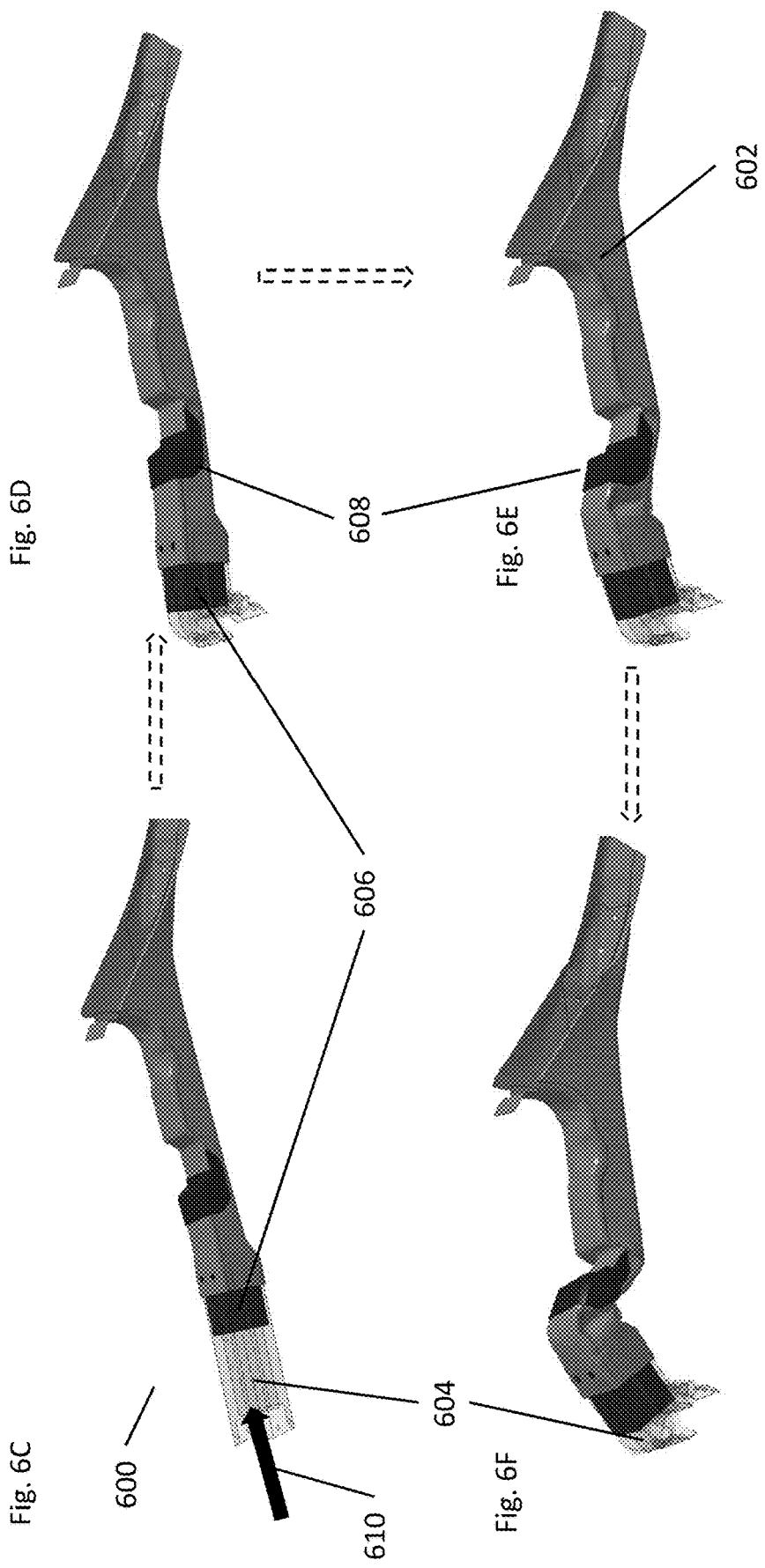

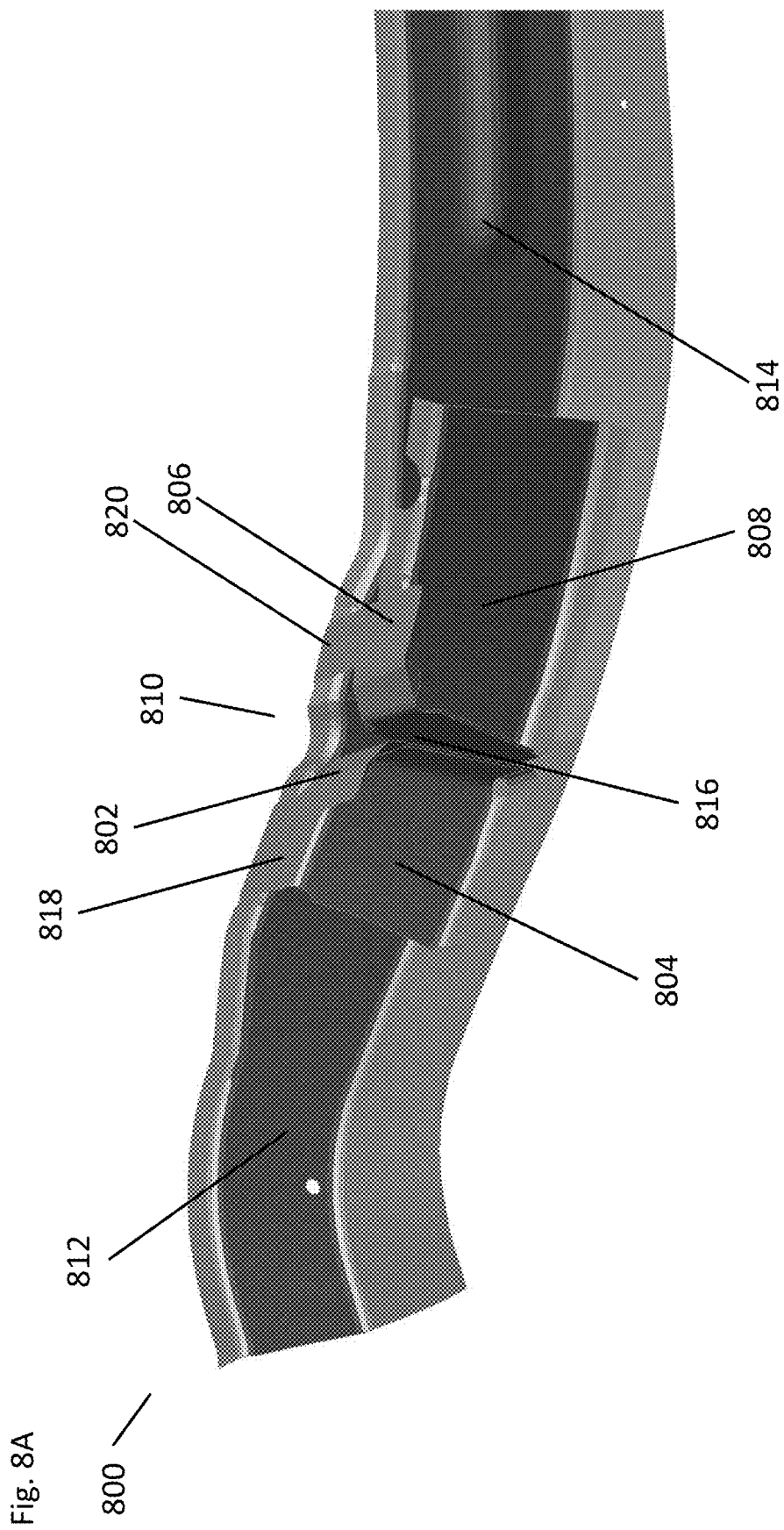

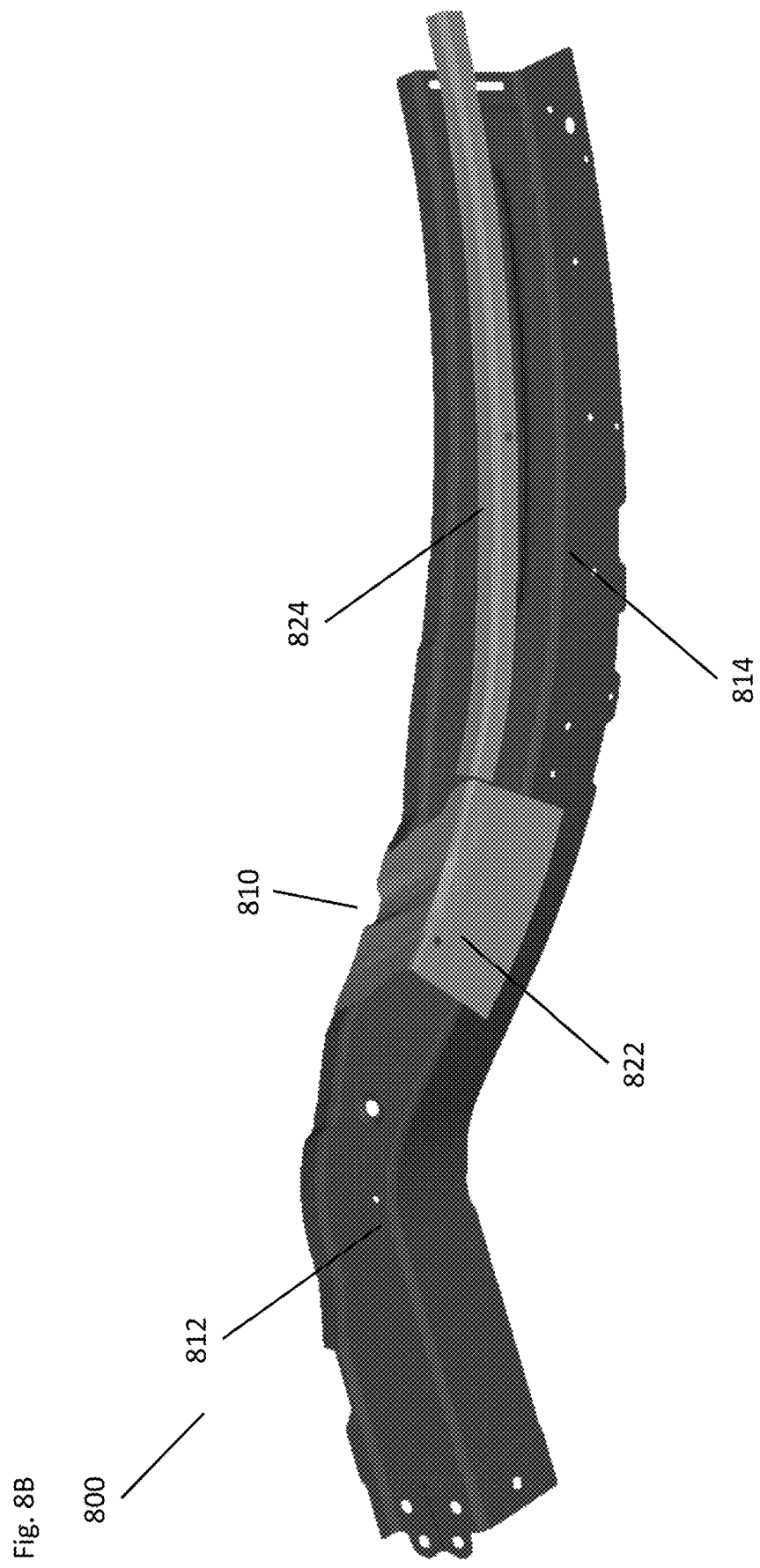

IMPACT FEATURES

CROSS-REFERENCE TO RELATED APPLICATIONS AND CLAIM OF PRIORITY

This application is a continuation of U.S. patent application Ser. No. 16/920,375, filed on Jul. 2, 2020, which claims priority to U.S. Provisional Patent Application No. 62/869,823 filed on Jul. 2, 2019. The contents of the above-identified patent documents are incorporated herein by reference.

TECHNICAL FIELD

The present invention relates generally to the safety features often related to vehicles, and more specifically to impact energy absorption structures for use in vehicles that can be tuned and/or adjusted to account for a number of different vehicle configurations.

BACKGROUND

Automobile vehicles may generally be described in relation to a body or cabin, which are designed to enclose the passengers, and the various electrical, mechanical and structural systems, subsystems and components that allow the vehicle to operate. Often hidden behind the functional features of an automobile are a number of safety features designed to allow for the safe operation of the vehicle as well as to prevent the vehicle framework from intruding on the passenger compartment in the event of a crash. Furthermore, many such elements help to reduce the damage to many other functional components such as the battery, powertrain, chassis etc. in traditional automobile design, the body and various functional systems and components are inextricably intertwined. For example, mechanical linkages directly interconnect the steering and brake systems between the wheels and the passenger, and elements such as the motor and cooling systems are disposed in a front compartment that extends upward into the body of the vehicle. Among all the systems and subsystems that are integrated into the automobile design, the safety of the occupants is foremost and many efforts have been made to ensure the passenger compartment is protected as much as possible during a crash event.

The numerous interconnections between the body and functional components of a vehicle create a number of manufacturing and design inefficiencies, specifically related to the complexity of safety features necessary for the functionality of the vehicle. For example, a change in the motor may necessitate a change in the dimensions of the body which can also require necessary changes to safety features. Similarly, altering the passenger compartment to include newly desired features, such as, for example, altering the vehicle profile or passenger seating position, may require a redesign of one or all of the functional systems of the vehicle. Additionally, any changes to the vehicle design can potentially affect the underlying safety of the vehicle for the occupants. Accordingly, a great deal of effort has been made to design generic functional vehicle platforms (also referred to in the art as "skateboards") onto which numerous vehicle bodies (also referred to in the art as "top hats") may be easily attached without requiring any alteration to the components of the vehicle platform itself while maintaining the same desired safety features.

To accomplish this, vehicle platform designers endeavor to locate as many of the functional components of the vehicle into the vehicle platform as possible so that the number of interconnections between the vehicle body and vehicle platform can be reduced. Additionally, the integration of different vehicle bodies on a generic vehicle platform can create a number of issues not readily anticipated in traditional vehicle design. For example, traditional vehicles can develop a single framework for a certain class of vehicle that may be designed to maintain certain safety standards within that classification such as an SUV. However, traditional design would not allow for an SUV body to be placed on a sedan frame and still maintain the desired level of safety for the occupants because the additional load of an SUV would alter the functionality of the sedan frame.

Recent advances in electric motor and battery technologies have made electric vehicles practical to manufacture. Electric vehicles have a number of advantages over conventional internal combustion vehicles, including the dramatically reduced footprint of the drive train components and the potential for increasing the occupant space within the body of the vehicle. However, despite the many advantages, many manufacturers still maintain the design elements of the past resulting in the same inefficiencies in the design and functionality of the safety systems and components.

SUMMARY

Many embodiments are directed to electric vehicle platforms and a variety of safety features that can be implemented within an electric vehicle platform. Many embodiments include features that are modular in nature and therefore tunable to accomondate a wide range of different vehicle configurations that may require an associated wide range of structural and functional considerations. Some embodiments may be directed to materials, component systems, as well as methods of manufacture.

Many embodiments include a vehicle platform with a frame structure made up of a plurality of interconnected structural elements that generally form a planar body with a front portion, a rear portion, a central portion, and a front and rear transition portion that connects the front and rear portions to the central portion. The front portion has an upper energy absorption unit with an elongated body that is connected to an upper lateral component and a portion of the frame structure. The upper energy absorption unit is disposed such that it is longitudinally parallel with a longitudinal axis of the frame structure and aligned with the lateral frame component. The body of the upper energy absorption unit has a crush zone such that when an impact force is introduced the crush zone compacts a predetermined distance while absorbing energy from the impact force.

The front portion also has a lower load path configured with a lower energy absorption unit having an elongated body with a first end connected to a lateral front component of the frame structure and a second end opposite the first end wherein the second end is connected to a portion of the frame structure. The lower energy absorption unit has a designated crush zone and a bending zone with a body such that when the impact force is introduced the designated crush zone compacts a predetermined distance while absorbing energy from the impact force and wherein the bending zone is configured to bend and deflect subsequent energy not absorbed by the designated crush zone. At least one of the upper energy absorption unit in the upper load path or the lower energy absorption unit in the lower load path has a tunable control element having a body configurable to crush a predetermined distance range from the receipt of the impact force In other embodiments, the upper energy absorption unit in the upper load path and the lower energy absorption unit in the lower load path of the front portion comprise of a tunable control element configurable to crush a predetermined distance range from the receipt of an impact force.

In still other embodiments, the lower control element is disposed within an interface between the crush zone and the bending zone and wherein the control element controls the amount of compaction that occurs in the crush zone.

In yet other embodiments, at least one of the upper and lower control elements have a length that extends from the interface into the crush zone and wherein the length of the control element may be tuned to account for a different impact force.

In still yet other embodiments, the control elements is connected to the crush zone using a plurality of mechanical fasteners.

In other embodiments, the plurality of mechanical fasteners is selected from the group consisting of rivets and bolts.

In still other embodiments, the upper control element is disposed within a connection interface between the upper energy absorption unit and the vehicle frame structure.

In yet other embodiments, the upper and lower control elements have dimensions that can be adjusted to control a crush stack up in the upper and lower energy absorption units respectively.

In still yet other embodiments, the vehicle platform has a lower deflection element having an angular body an inboard side and an outboard side wherein the inboard side extends parallel and rearward along a portion of the frame structure and the outboard side extends outward and rearward from the front end of the framework at an angle such that it progressively diverges from the frame structure such that when an impact force is introduced the lower deflection element deflects the impact energy in a direction away from the frame structure.

In other embodiments, the vehicle platform has an upper deflection unit with an elongated body having an external face and an internal face, where the elongated body extends outward from the frame and is configured to deform in such a way that it moves inward towards the frame structure during an impact to the external face and wherein the upper deflection unit has a spacing element disposed on the internal face having a predefined body shape configured to stop the deformation of the deflection unit by contacting the upper later frame component during deformation.

In still other embodiments, the predefined body shape is triangular.

In yet other embodiments, the vehicle platform has a plurality of support elements disposed within an interior space of the interconnected structural elements throughout the frame structure.

In still yet other embodiments, at least two of the plurality of support elements are disposed within the front transition portion and are separated by a predefined distance such that during an exposure to the impact force the at least two support elements can move towards each other until they contact thereby reducing the amount of impact energy distributed to other components of the frame structure.

In other embodiments, wherein the transition element is configured with a groove disposed within the vehicle frame structure between the at least two support elements that allows for a desired amount of bending in the transition portion.

In still other embodiments, at least one of the at least two support elements has an elongated body that extends substantially along lateral support elements of the frame structure such that it extends into at least a section of the central portion.

In still yet other embodiments, one of the support elements has a body that extends over the transition point.

In other embodiments, the support elements are bulkhead elements.

In still other embodiments, the central portion is formed of at least a first lateral element and a second lateral element separated by a space and a plurality of central spacing elements disposed within the space and extending between the first and second lateral elements, and wherein the first and second lateral elements are disposed near lateral outside portions of the frame structure.

In still yet other embodiments, each of the plurality of central spacing elements have tunable dimensions such that the frame structure can accommodate a number of impact energies.

In other embodiments, the vehicle platform has a plurality of longitudinal spacing elements that are disposed between at least one of the plurality of central spacing elements and a lateral support of the frame structure such that the longitudinal spacing element is substantially perpendicular to the central spacing element.

In still other embodiments, the vehicle platform has a side impact energy absorption unit with an elongated casing element having an inside surface and an outside surface. Additionally there are a plurality of hollow structural containers each having an elongated body forming an outer shell with a first open end and a second open end wherein the first end is attached to a rear backing plate and the second end is attached to a front backing plate such that the front and rear backing plates close off the plurality of hollow structural containers. Each of the front and rear backing plates are attached to the inside surface of the casing element such that the elongated body of the structural containers runs substantially perpendicular to the longitudinal axis of the casing element. There are also a plurality of side structural support elements disposed along the longitudinal length of the casing element such that they are disposed on at least one side of the hollow structural containers and running parallel to the elongated body of the structural containers.

In still yet other embodiments, at least one side impact energy absorption unit is disposed on an outside surface of each of the first and second lateral elements.

In other embodiments, a plurality of side impact energy absorption unit are disposed on an outside surface of each of the first and second lateral elements.

In still other embodiments, the vehicle platform has a plurality of reinforcement patches disposed over the front or rear transition portions, wherein the reinforcement patch has an elongated body and extends substantially along the transition portion in a plurality of positions.

In still yet other embodiments, the elongated body of the reinforcement patch wherein the dimensions are tunable to accommodate the impact force.

Other embodiments include a side impact energy absorption unit that has an elongated casing element having an inside surface and an outside surface. Additionally, the side impact unit has a plurality of hollow structural containers each having an elongated body forming an outer shell with a first open end and a second open end wherein the first end is attached to a rear backing plate and the second end is attached to a front backing plate such that the front and rear backing plates close off the plurality of hollow structural containers. Each of the front and rear backing plates are attached to the inside surface of the casing element such that the elongated bodies of the structural containers run substantially perpendicular to the longitudinal axis of the casing element. There are also a plurality of side structural support elements disposed along the longitudinal length of the casing element such that they are disposed on at least one side of the hollow structural containers and running parallel to the elongated body of the structural containers.

In other embodiments, the casing comprises a plurality of attachment points such that the side energy absorption unit is interconnectable to a vehicle platform structure.

In still other embodiments, at least a portion of the plurality of hollow structural containers run parallel to the longitudinal axis of the casing element.

In still yet other embodiments, the dimensions of each of the plurality of hollow structural containers is adjustable to account for a higher or lower level of impact energy absorption Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 6A to 6G illustrate a lower load path energy absorption unit in accordance with embodiments.

FIGS. 8A and 8B illustrate a transition section of a vehicle platform framework in accordance with embodiments.

DETAILED DESCRIPTION

Figure 1:
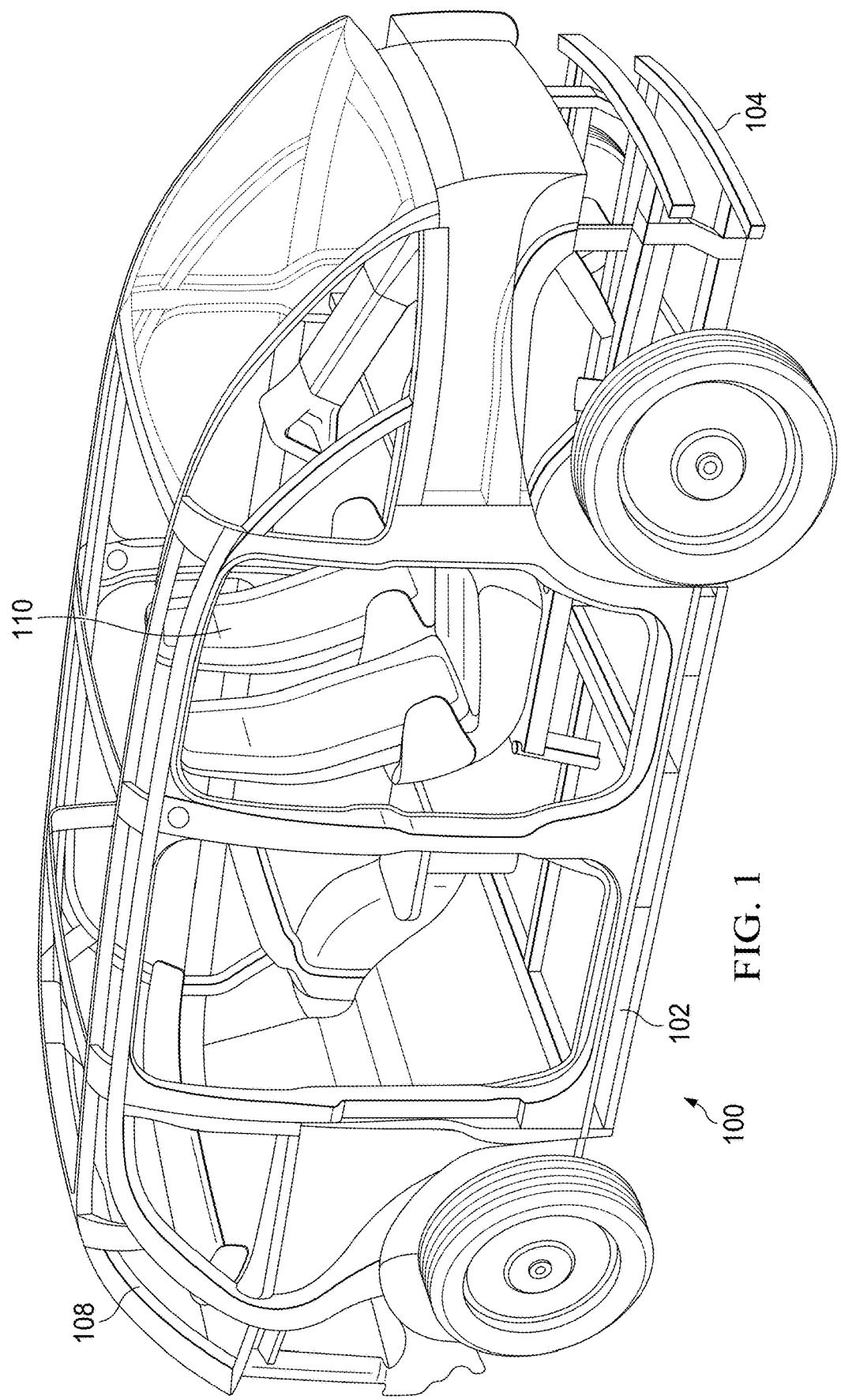
FIG. 1 illustrates a vehicle in accordance with embodiments.

Turning now to the drawings, embodiments of the invention include a vehicle platform with a variety of crash features for the front, rear, and side portions of the vehicle. Specifically, embodiments include a variety of safety components and/or systems that can be tuned or adapted to provide adequate protection to the passenger compartment and other functional components of the vehicle platform. For example, some embodiments may have a crumple zone in the front of the vehicle. The crumple zone may be configured with a variety of features that can be implemented individually or as a group to reduce the potential intrusion of the framework or other functional components of the vehicle into the passenger compartment. Additionally, such features can reduce potential damage to such components as the drive train or battery compartment. Some embodiments may incorporate a lower load path structure connected to the framework that is designed with a number of tunable portions or elements such as a compaction zone and a bending zone. Additionally, some embodiments may allow for compaction and/or bending to a certain point so as to further direct impact energy away from the passenger compartment and/or other functional components. Other embodiments may include one or more bulkhead reinforcement elements integrated within the framework rails that slow, reduce, and/or stop the compaction of the front end of the vehicle. Bulkhead elements can also be tuned or adjusted with respect to size, shape, and/or spacing to accommodate a variety of different impact energies. Additionally, other embodiments may include the use of one or more deflector elements affixed to the front portion of the framework where an upper component is designed to bend and subsequently deflect the main body of the framework away from the point of impact. Likewise, some embodiments may have a lower component along the lower load path positioned at a similar deflection angle as the upper component and designed to aid in the deflection.

Many of the embodiments may also incorporate rear impact protection systems and components to absorb the energy from an impact and do so in such a way that intrusion into the passenger compartment is minimized. For example, some embodiments may include a reinforcement patch disposed along the side rails of the framework that act to minimize bending of the rear torque box in a rear end impact. Additional embodiments may include various bulkhead elements disposed within the rear rails adding extra support and strength.

Various embodiments may also include a side impact protection element that is positioned between the body of the vehicle and the framework. The side impact protection as is described in the embodiments herein can help prevent intrusion into the passenger compartment as well as the sealed battery compartment.

Traditional vehicles may employ any number of crash features into various functional components as well as the body and/or frame of the vehicle. In some cases, the features may be shared across vehicle platforms and some may share the same features within the same vehicle classification. Traditional vehicles follow one of two fabrication techniques, unibody or body on frame. Each of the two fabrication techniques have various advantages and disadvantages including the strength of the vehicle in a crash scenario. Unibody construction tends to distribute the stresses throughout the body while a body on frame requires the frame to be strengthened to absorb the energy involved in a crash.

The advancement of electric vehicles is increasingly allowing auto manufactures to rethink the traditional method of manufacturing vehicles to exploit the advantages that electric vehicles offer. Some advantages include the increase in available space above the wheelbase of the vehicle. With the absence of bulky internal combustion engines and requisite transmissions, the lower portion of the vehicle can be made generally flat with many of the functional components of the vehicle housed within a vehicle platform, commonly referred to as the skateboard. Accordingly, the vehicle platform within the context of the embodiments herein can be adapted for use with a number of body structures. With such advancements and adaptability to a variety of body structures the safety features of such vehicle platforms need to be adaptable such that the overall level of safety for the passengers is maintained. The primary concern with such electric vehicles is to have a generally universal vehicle platform that is designed to prevent intrusion into the passenger compartment during the event of a crash.

While structural elements called crumple zones are often used in vehicle design to absorb the energy from an impact by way of controlled deformation to one or more components of the frame or other vehicle components, implementing such crumple zones in electric vehicles can present some unique challenges as the extension of the passenger compartment further to the front and rear of the vehicle reduces the amount of deformation space for these crumple zones. Furthermore, as many such vehicles include a battery compartment containing potentially flammable or explosive battery elements, new safety features must be implemented to protect the battery compartment from unwanted penetration.

Referring now to the drawings, within the context of electric vehicles with a uniform vehicle platform, many embodiments are illustrated. FIG. 1 illustrates an embodiment of a vehicle platform 100 with a framework structure 102 that has a front and a rear portion. The platform 100 incorporates an embodiment of a body structure 108 that has a passenger space 110 that is ultimately the desired protection zone of the vehicle (i.e., with minimal crumple zone resulting from the absence of a front engine compartment or trunk). The front portion may have a variety of elements such as deflectors and a forward crumple zone that may be designed to absorb frontal impact energy in such a way as to protect the passenger compartment.

Figure 2:
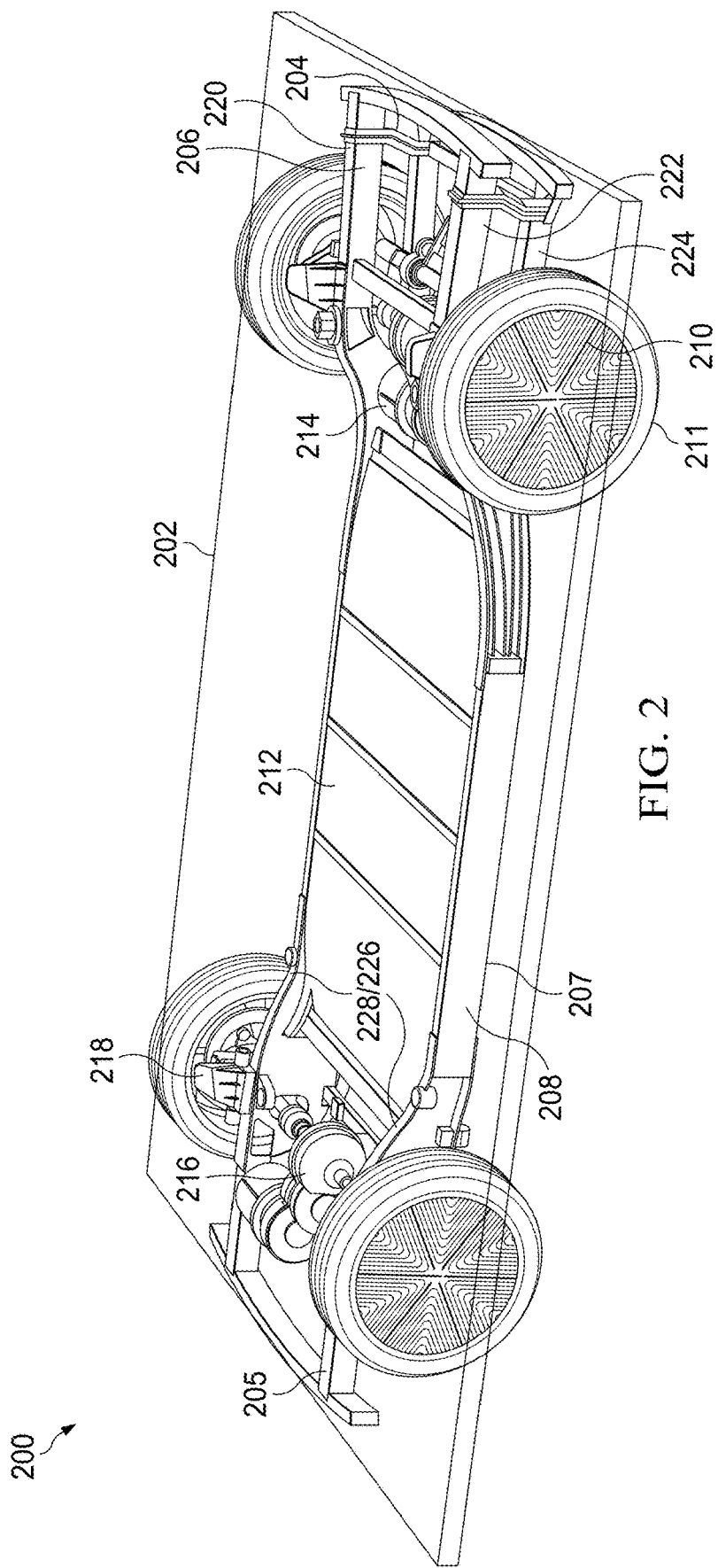
FIG. 2 illustrates a vehicle platform in accordance with embodiments.

FIG. 2 illustrates the overall layout of a vehicle platform 200 in accordance with embodiments that integrates functional systems including energy storage, drive train, suspension, steering, braking, and safety systems, additional other sub-systems and components substantially within the boundaries of the vehicle platform. As used herein, the boundaries of the vehicle platform will be taken to comprise a generally horizontal vehicle platform plane 202 extending the width of the vehicle platform and from the top face 204 of the uppermost frame structure 206 to the bottom face 207 of the frame structure 208. In various other embodiments the boundaries of the vehicle platform may also comprise areas positioned anywhere within the upper and lower dimensions of the wheels 210 and/or tires 211 of the vehicle. With respect to the platform plane, it should be noted that, as shown in FIG. 2, many embodiments of the vehicle platform may comprise a frame having portions disposed at different heights relative to each other (e.g., having front and rear portions elevated relative to a central portion as illustrated in FIG. 2), in such embodiments it will be understood that the platform plane 202 may be described as an undulating plane such that in some embodiments functional components are defined as not extending above an undulating plane defined by an upper face of the subject portion of the vehicle platform frame. Regardless of the specific boundaries of the vehicle platform, it will be understood that in various embodiments functional components within this platform plane may be disposed such that they do not extend within the inner volume defined by a vehicle body when secured atop the vehicle platform.

Vehicle platforms capable of allowing for such self-contained layouts in accordance with embodiments may be described in reference to various internal vehicle platform portions: a central portion generally disposed between the wheels, and front and rear portions extending from the end of the central portion to the front and rear ends of the vehicle. Additionally, many embodiments may have a transition portion that connects the front and rear portions to the central portion. Descriptions of the specific frame elements will be more fully described later, however, as shown in FIG. 2, these portions are subdivided and the systems, subsystems and components are configured within such that a self-contained vehicle platform is realized.

The embodiment shown in FIG. 2 comprises one functional layout suitable for an electric vehicle, including an energy storage system (e.g., battery pack(s)) 212, front 214 and rear 216 drive trains (e.g. electric motors and associated power electronics, transmissions, etc.), and control systems, such as suspension, steering and braking 218. As can also be illustrated in the embodiment of FIG. 2, the drive train elements (e.g., motors, transmissions, etc.) may be positioned in-line with the wheel and close to the front and/or rear portions of the vehicle platform frame 206 thereby allowing for increased passenger space within the vehicle cabin. In addition to the propulsion systems and suspension systems that may be incorporated into the vehicle platform 200, many embodiments may incorporate a variety of other components such as control systems designed to operate a variety of other systems (e.g., brakes, steering, cooling, etc.). In many embodiments, the frame 206 of the vehicle platform 200 also comprises a variety of safety systems or features that are incorporated within the frame 206 of the platform 200. For example the front portion of the frame 206 that surrounds or houses the front drive train 214 may be provided with a protective features (e.g., crumple zone) 220 with an upper 222 and a lower 224 load path configuration that are designed to absorb the impact energy in a variety of manners.

Additionally, the rear portion of the frame 206 may be equipped with a variety of safety features or elements such as a reinforcement patch 228 that may be positioned over any number of frame element attachment points 226 to add additional strength to the frame 206. Furthermore, in some embodiments the reinforcement patches 228 may be adjusted in length, width, and/or other physical dimensions to accommodate a number of different impact forces.

Figure 3A:
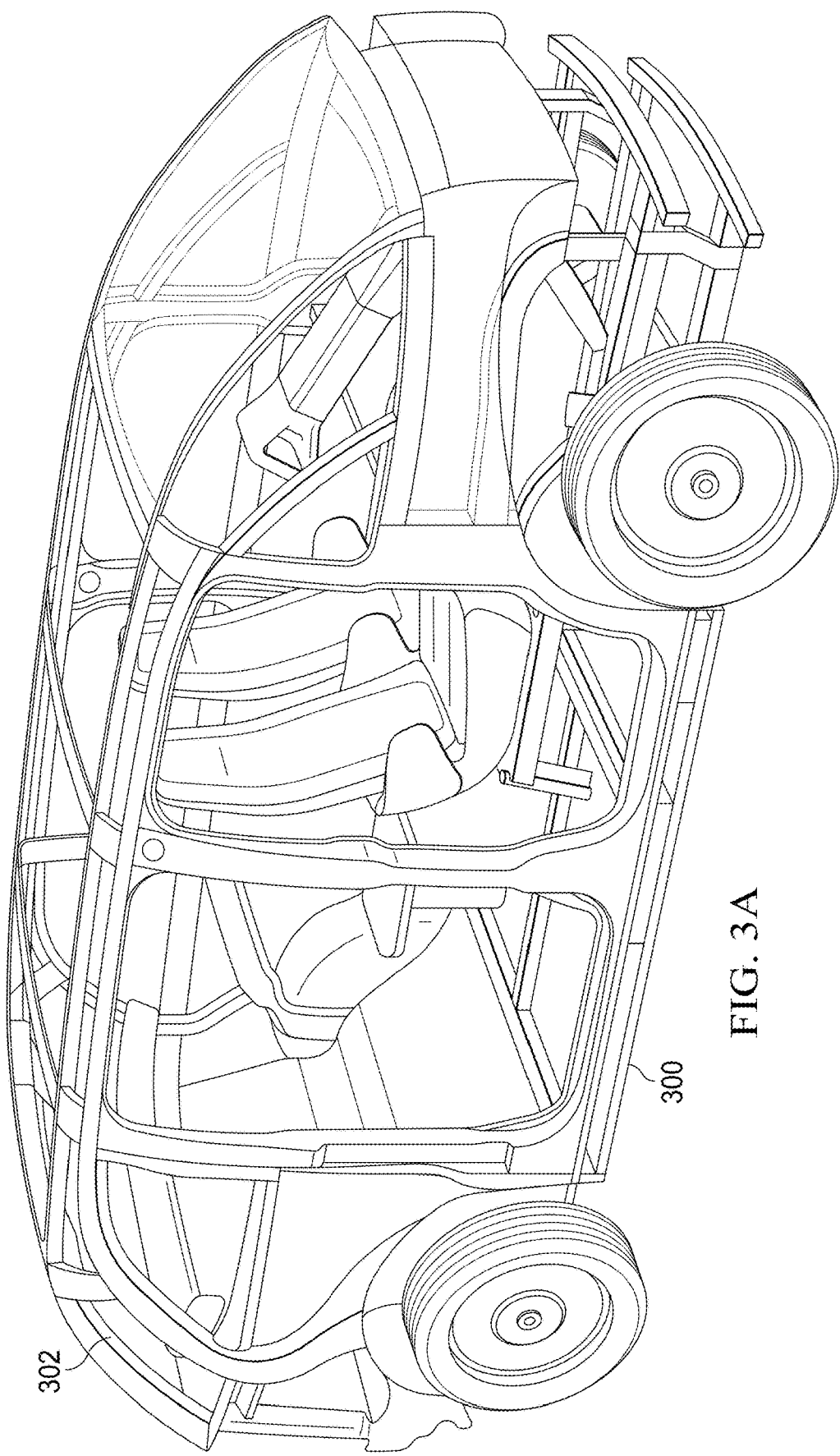
FIGS. 3A to 3D illustrate electric vehicle platform integrated with various vehicle bodies in accordance with embodiments.
Figure 3B:
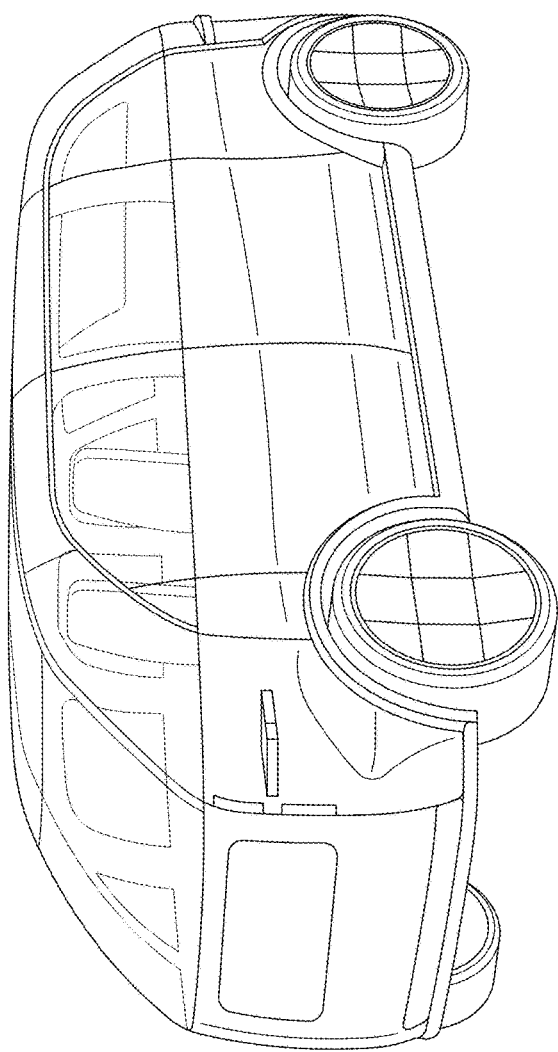
Figure 3C:
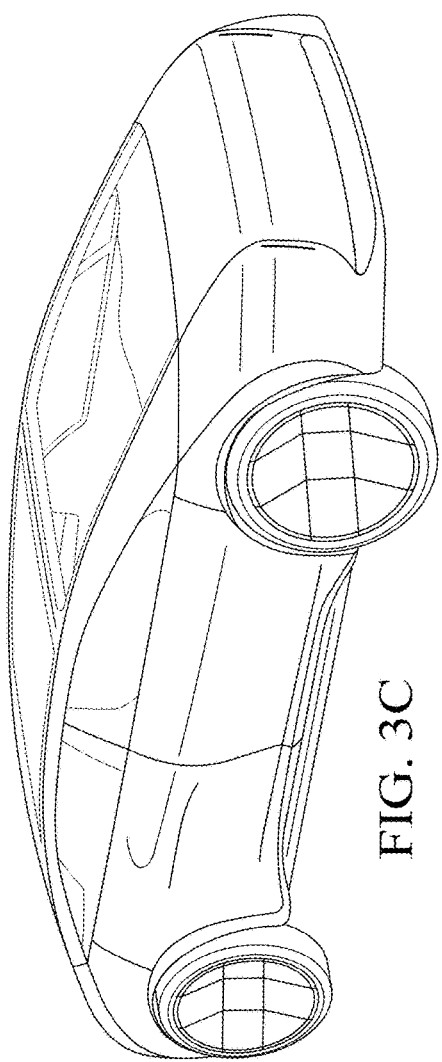
Figure 3D:
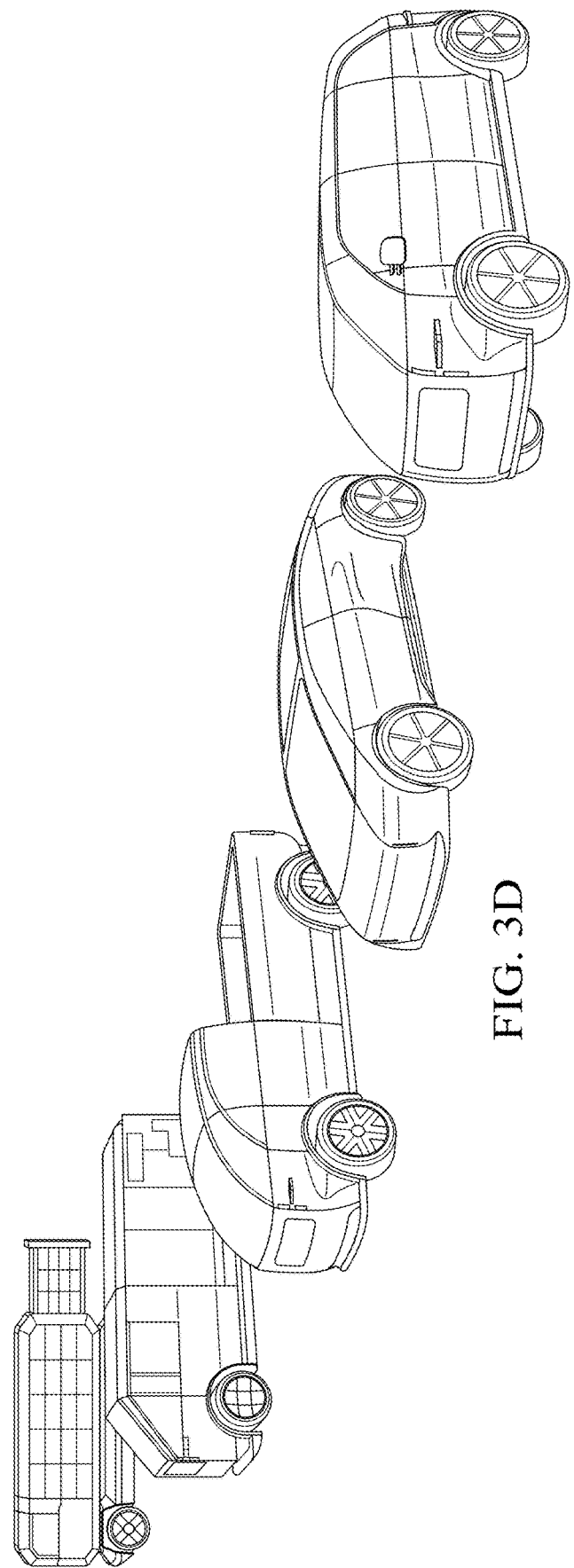

Since many embodiments may incorporate any number of body structures it is important to understand how and why the various safety systems described herein can be used and/or tuned to the various vehicle bodies to ensure optimal passenger safety. For example, FIGS. 3A to 3D illustrate several embodiments of body structures that can have different effects on the underlying vehicle platform from a functional and a safety standpoint. FIGS. 3A and 3B illustrate an embodiment of a vehicle with a taller and more open concept body or top hat structure that can be dramatically different in terms of impact loads that the vehicle may see in any number of crash scenarios over the embodiment illustrated in FIG. 3C. Likewise, FIG. 3D illustrates other embodiments of vehicles with top hat structures designed for a number of different uses such as cargo transport. Accordingly, such embodiments may be subject to different loads during use which may be subject to different impact scenarios. Thus, the impact features of the embodiments illustrated in FIGS. 3A-3C may necessarily be different even though the underlying platform may have a similar form and structure. Hence a need to modularity can be required in the different structures.

Figure 4:
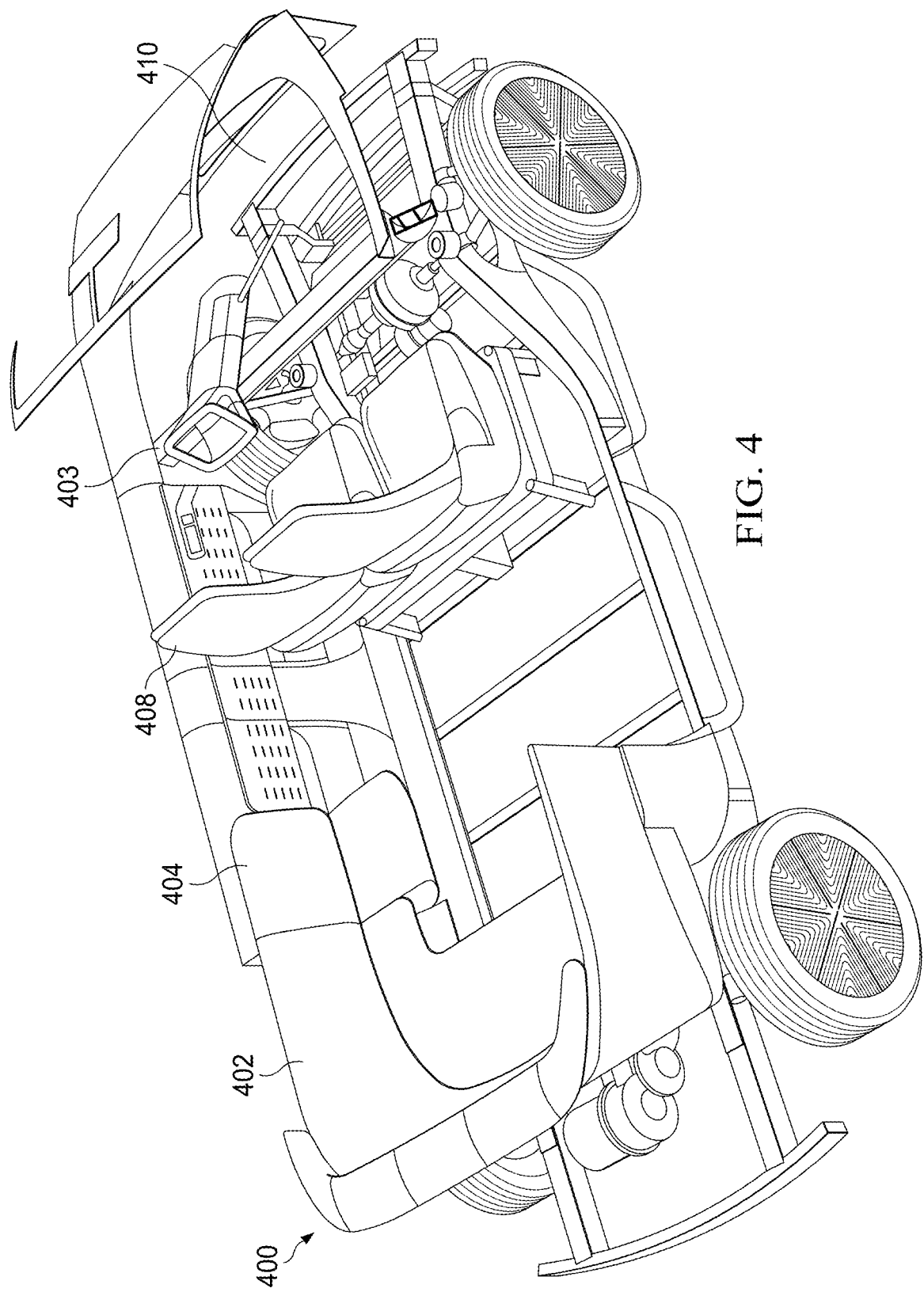
FIG. 4 illustrates an electric vehicle platform having an embodiment of a vehicle cabin configuration integrated therewith in accordance with embodiments.

FIG. 4 illustrates a specific example of a passenger compartment in accordance with embodiments. In accordance with advancements in electric vehicles, many embodiments may incorporate an open passenger compartment 400 where the front portion 410 is relatively minimalistic in that very few interactive components may exist. A steering column 403 may be present with a minimalized dash panel. In some contexts, a minimalist design approach can be beneficial. However, such embodiments can present unique challenges from a safety standpoint that may require further adaptability and tuning to accommodate the various internal design types. As previously discussed, passenger safety is the primary function of the safety features and ensuring that the passenger compartment is not compromised or at least minimal penetration occurs in the event of an accident. Therefore, many embodiments incorporate a variety of features that can help to reduce and or redirect the impact energy seen by the vehicle in any number or crash scenarios with any number of vehicle body types.

Figure 5:
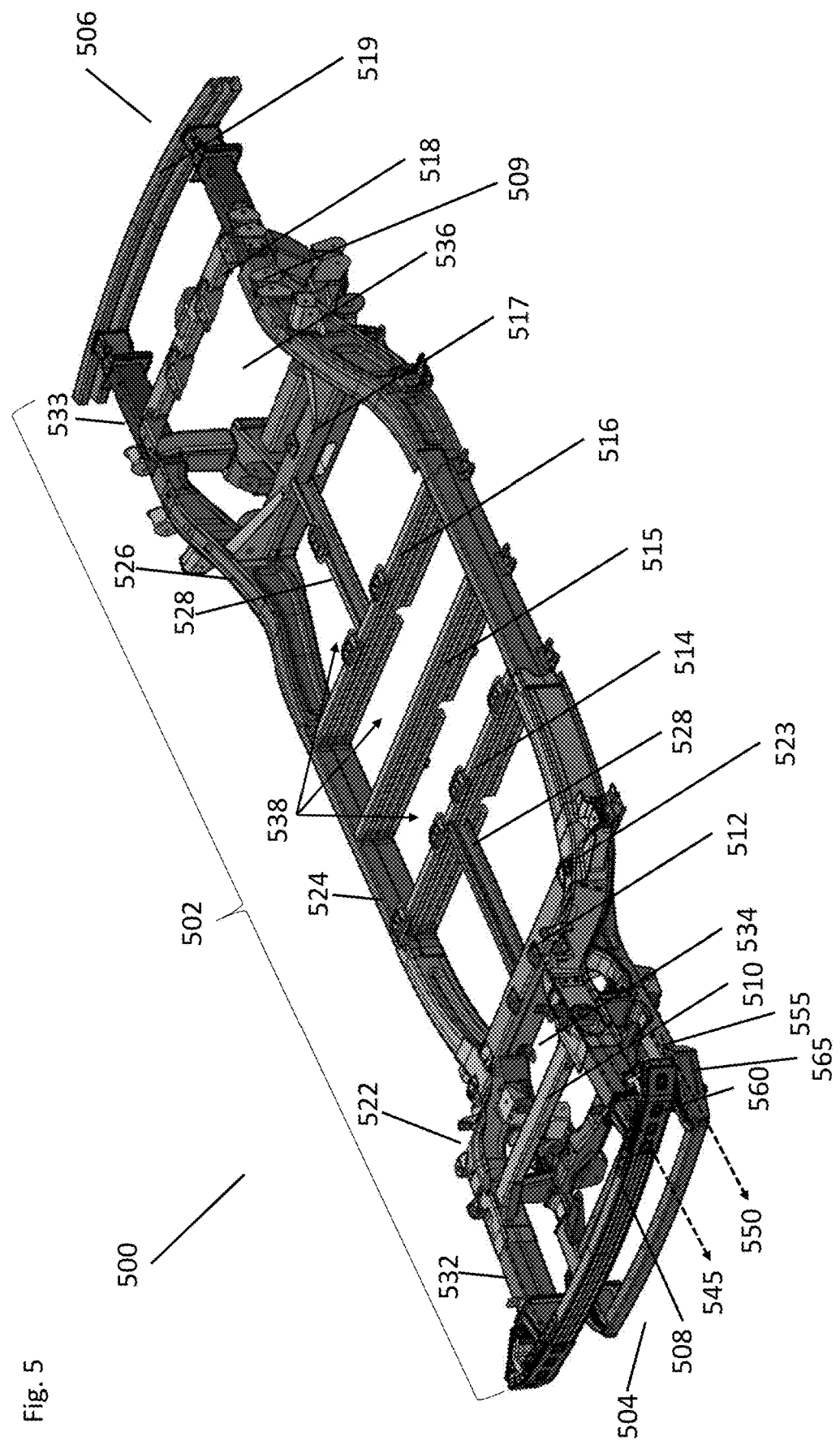
FIG. 5 illustrates a vehicle platform framework in accordance with embodiments.

Referring to FIG. 5 an embodiment of a vehicle platform frame 500 is illustrated. Within the frame 500, are a plurality of interconnected frame elements that may also include a variety of features designed to provide strength and support to the frame, the integrated functional elements of the vehicle platform, as well as the overlying body structure. Additionally, the various interconnected elements may provide strength and rigidity that can be factored into the overall safety of the vehicle. Generally these structural elements can be divided between left and right frame rails 502 that extend from the front 504 to the rear 506 of the vehicle and define the length of the vehicle, and a plurality of lateral structural cross member elements (e.g., 508, 510, 512, 514, 515, 516, 517, 518, 519) that extend between the frame rails and define the interior width of the vehicle. Although these frame rails and lateral structural elements are described collectively, it will be understood that in accordance with many embodiments they may and are often formed of multiple interconnected structural elements.

In various embodiments, as shown in FIG. 5, the frame rails 502 may be divided into a number of either unitary or separate and interconnected structural members that extend longitudinally between the front and rear ends of the car. Starting at the front 504 of the vehicle platform, left and right front frame rails 522 may extend backward from the vicinity of the front motor support cross member 510. Rearward of the front motor support cross members 510 the front frame rails angle outward and extend rearward passing through the front torque box 523 to meet the left and right mid-body side rails 524. Rearward of the mid-body side rails, left and right rear frame rails 526 (which are either extensions of or joined together with the mid-body side rails) angle inward and extend to the vicinity of the rear motor support cross member 518. For added strength and rigidity a number of laterally disposed cross member structural elements 512, 514, 515, 516 and 517 may extend between the mid-body side and front/rear frame rails (e.g., 522, 524, 526). Although a specific number of lateral cross member structural elements are shown spanning the mid-body side rails in FIG. 5, it will be understood that embodiments may incorporate any number of such cross member structural elements in any number of positions suitable to provide sufficient lateral support to the vehicle platform frame. Furthermore, many of the lateral structural elements can be tuned or adjusted dimensionally to provide additional impact support in the event of a collision. In addition, further inner longitudinal structural members 528 may be provided to further strengthen the inner spaces of the mid-body from collapse in case of front or rear impact. In various embodiments, rails and structural members may be formed of a common structural member (e.g., elements 524 and 538) such that the tooling required for manufacture of the various structural members may be reduced.

Although specific arrangements of structural members, materials and methods of manufacture are described, it will be understood that many possible arrangements of structural members may be implemented that result in the creation of a plurality of inner frame volumes. Specifically, as shown in FIG. 5, lateral structural elements 508 to 512 extending between right and left front frame rail elements 522 define a front body space 534 in and around the front axle of the vehicle platform. Likewise, lateral structural elements 517 to 519 extending between left and right rear frame rail elements 526 define a rear body space 536 in and around the rear axle of the vehicle platform. Between the front and rear body space lateral elements 512 to 517 extending between side rails 522 to 526 define a mid-body space 538, which itself in many embodiments may be formed of a plurality of separate volumes by internal lateral and longitudinal structural elements (as shown by elements 514, 515, 516, and 528 in the embodiment illustrated in FIG. 5). In various embodiments, portions of the front 522 and rear 526 rail elements and respective front 534 and rear 536 body spaces may be elevated relative to the rest of the vehicle frame to accommodate functional drive train components as well as set the optimal height for the impact absorption region. The frame may also include other elements to surround and protect an energy conversion system. Where portions of the vehicle platform frame are disposed at different elevations relative to each other, it will be understood that the horizontal platform plane may take on an undulating conformation, as previously discussed.

Additionally, in order to provide adequate safety of the passengers, embodiments of the vehicle platform frame 500 may incorporate a variety of front/rear and side impact crumple zones. For example, frame rails in the front 532 and rear 533 in conjunction with front 508 and rear 519 crossmembers may work in concert as impact absorption/deflection zones to absorb or redirect an impact that occurs on either the front or rear of the vehicle. The impact absorption/deflection zones may incorporate a variety of features that are known in the art including, but not limited to, being made of an energy absorbing material, or being otherwise configured to crumple or deform when subject to an impact. Various materials may be used in the manufacture of the vehicle platform frame 500 including, for example, steel, aluminum, titanium, metal alloys, composite material, carbon fiber, and various combinations thereof. Some embodiments may utilize a honeycomb pattern and/or structure to provide additional energy absorption zones. Many embodiments may utilize a variety of bonding techniques to connect the various components, such as, for example, welding and/or bolting. Additionally, some components may be manufactured in any manner suitable to produce a portion of the framework that meets the desired outcome in terms of strength, function, and/or appearance. Furthermore, it should be understood that many embodiments described herein may be adaptable or tuned to accommodate a variety of different vehicle configurations that may require different loads as well as a unique number and combination of safety features.

The various embodiments described herein illustrate a vehicle platform that dramatically increases design flexibility while maintaining essential comfort and safety requirements. Embodiments further illustrate the adaptability of the vehicle platform to a variety of operational environments that may require a variety of different safety features. While the current disclosure may focus on a number of different functional and safety elements as individual sections for clarity, it will be understood that vehicle platforms according to embodiments may combine, include or omit any of the described functional and safety elements as desired by a specific vehicle design Embodiments Implementing Front Impact Zones Referring to the front 504 and rear 506 spaces, many embodiments may incorporate a variety of safety features and/or elements designed to absorb the energy from an impact. For example, the front space 504 may have an upper load path 545 and a lower load path 550 each of which will take on a different load in the event of a vehicle impact. The load paths as described herein refer to the path in which energy is directed during an impact event. As a vehicle can be exposed to any number of impact types, the different load paths can be designed to operate in a variety of manners to help absorb and deflect the energy of the impact. For example, in the United States, the Insurance Institute of Highway Safety (IIHS), as well as the National Highway Traffic Safety Administration (NHTSA), routinely performs a number of vehicle impact tests to evaluate the safety features on vehicles. A zero degree full frontal impact test as well as partial overlap tests are generally performed on the front passenger and driver sides of the vehicle. The IIHS evaluates, among other things, the amount of passenger compartment penetration in such tests and looks at the various structural elements that helped prevent or failed to prevent such penetration. Additionally, the IIHS performs similar side impact tests looking at similar penetration aspects. Regulators in other countries perform similar safety tests applicable to vehicles sold or distributed in those jurisdictions.

The many frontal impact tests illustrate that the front portion of a vehicle can experience high-energy absorption and thus many embodiments may require higher energy absorption over a short distance when the front motor compartment length is reduced. Thus, many embodiments may implement a rigid barrier such as the upper rail elements 532 to perform the high-energy absorption early on in a frontal impact. However, it is undesirable for the load path to experience stack-up that results when energy absorption has bottomed out or reached its peak during the impact event. Therefore, many embodiments may utilize an additional lower load path structural element 555 configured to engage at the beginning of the impact event and stay engaged up to a desired point from which it can then disengage from the impact direction. The disengagement can aid in removing the vehicle from the direction of the impact, for example, by deflection of the impact and direct the vehicle away from the impact.

The lower load path element 555, in accordance with many embodiments, may function atypical from that of a traditional feature. Traditional features tend to be designed to break away from the framework and act as deflectors by disconnecting from the frame. In contrast, many embodiments may utilize a lower load path that can maintain a connection with the vehicle framework structure while absorbing impact energy and deflecting impact energy. The deflection component can work in conjunction with the frontal impact component during a full frontal impact as well as deflecting during the an offset or partial offset impact.

Figure 6A:
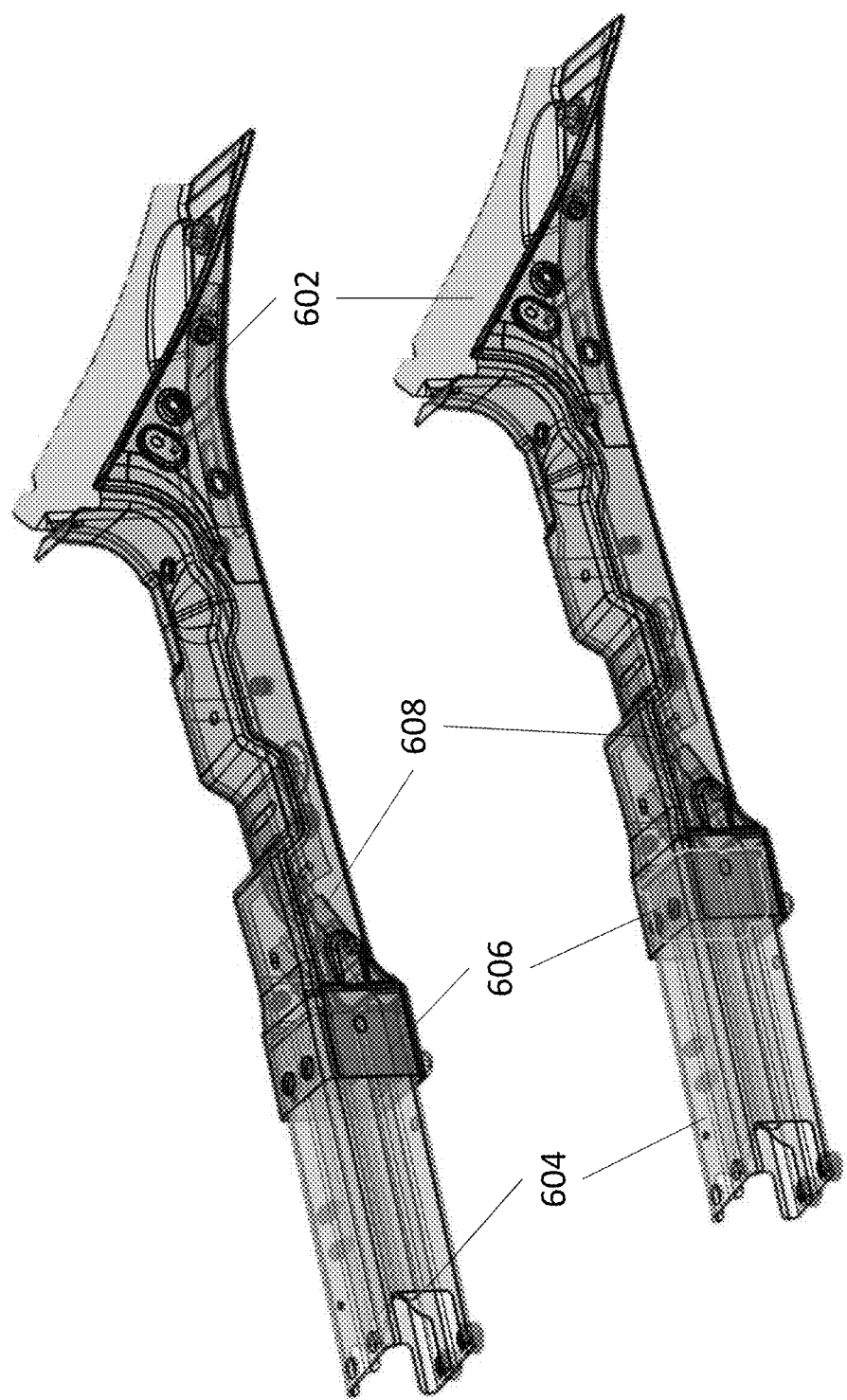
Figure 6B:
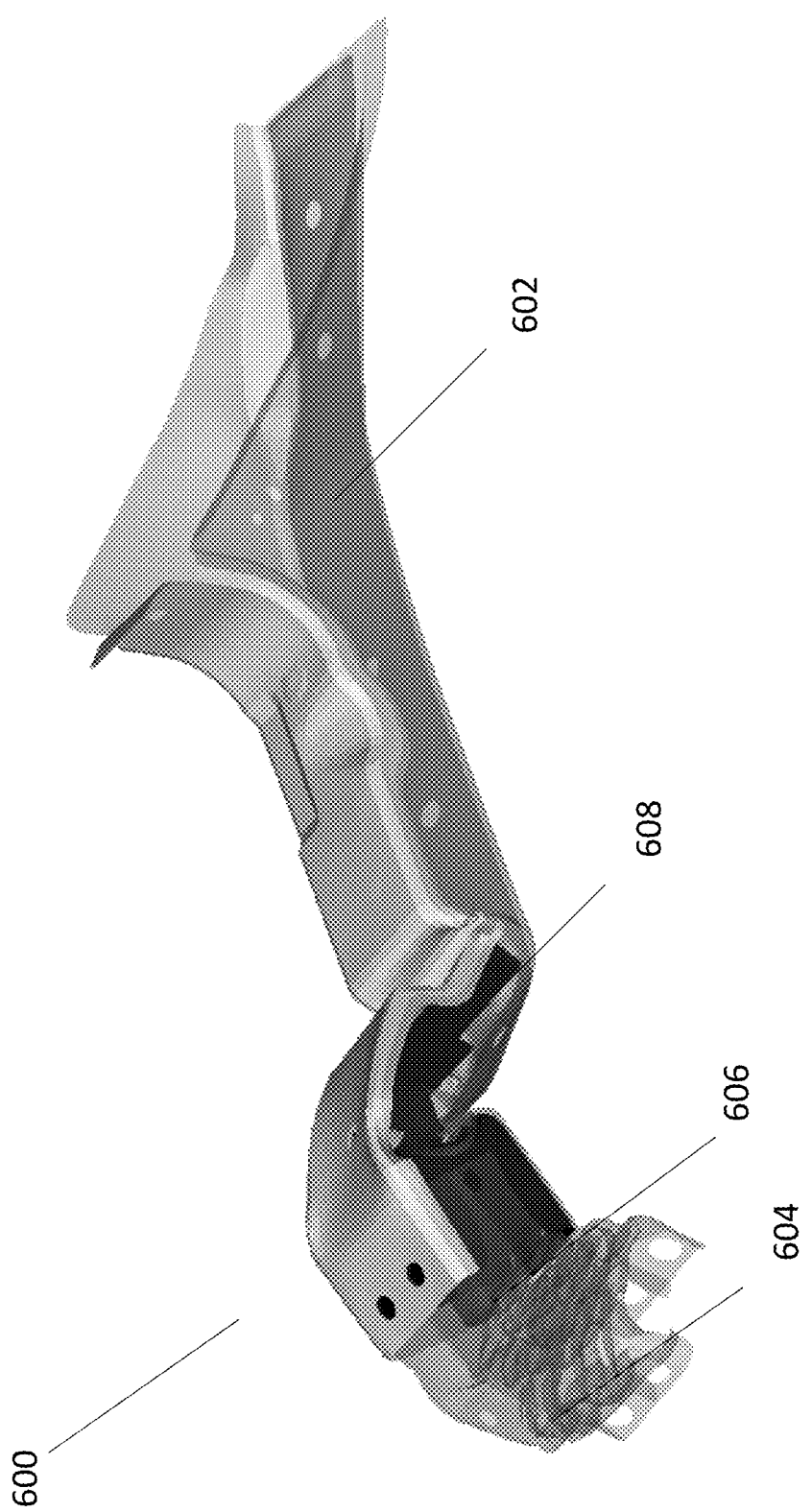

Referring now to FIGS. 6A and 6B, an embodiment of a lower load path element 600 is presented. In many embodiments, the lower load path element 600 may be connected to and removable from a portion of the frame 602 that has a fixed length and the lower load path element may have multiple key elements designed to absorb the energy from an impact in different ways. For example, the front portion of the lower load path may be configured with a lower load path crush zone element 604 that is designed to crush during an impact. The crush zone element 604 may have a controlled deformation similar to a traditional crumple zone; however, the crushing may only occur over a desired range or distance. In accordance with many embodiments, the desired crush distance can be controlled by various elements such as the material, overall shape and design, and some embodiments may utilize a crush control element 606. The crush control element 606, in accordance with many embodiments, is designed to keep the crushing within a desired crush zone before transmitting the impact forces into any additional element. This can help to prevent the undesirable stack up that can often occur in a typical crumple zone. In accordance with some embodiments, the crush control element 606 can be tuned or adjusted in dimensions and/or materials in order to achieve the desired level of stack up. Once the lower load path crush zone 604 has reached the desired crush distance a bending element 608 can then designed to bend the lower load path element 600 in a direction that can help move or adjust the vehicle away from the direction of impact. Furthermore, such elements can help to reduce or eliminate the impact on the frame structure 602 thereby allowing for increased safety. As previously mentioned, the lower load path element can be removable from the frame work. Such adaptability and modularity of elements can be appreciated from a variety of viewpoints including different vehicle body designs as well as vehicle maintenance.

In accordance with many embodiments, the length of the crush zone 604 and control element 606 can be adjusted or tuned to account for the change in forces that may vary with the number of top hat configurations that the vehicle may assume. FIG. 6B illustrates a lower load path element 600 after it has undergone an impact. It can be seen the crush zone 604 is compacted and the bending element 608 has been deformed in such a way to minimize damage to the vehicle. This can be an important part of frontal crash elements. Accordingly, many embodiments of frontal crash elements may incorporate different configurations of lower path crush elements to reduce the amount of impact that occurs and reduce the risk of an impact affecting the passenger compartment.

FIGS. 6C-6F provide an illustration of a sequence of impact energy absorption that may occur during a vehicle crash. For example, FIG. 6C illustrates a lower load path 600 prior to the introduction of impact energy and an arrow 610 that indicates the direction of the impact energy. FIG. 6D illustrates the initial crumpling that may occur in the crush zone 604 and how the control element 606 can limit the amount of crumpling that can occur before the energy is transferred into the bending element 608. FIG. 6E further illustrates the bending element 608 allowing for bending to occur over a desired range such that the impact energy does not adversely affect the portion of the frame structure 602. This can be important in the function of any vehicle, since frame damage can have lasting impacts on vehicle functionality. Furthermore, by reducing the effects of the impact on the frame, the use of crush zones, control elements, and bending elements, can help reduce the effects on the passenger compartment. Finally, FIG. 6F illustrates an embodiment of a final state of the lower load path after the absorption of the impact energy 610. It can be appreciated, that numerous embodiments can incorporate impact control features along lower load paths to help protect the frame and passenger compartment.

The lower load path element as illustrated in FIGS. 6A-6F can help to take advantage of many things found in an electric vehicle and/or an electric vehicle platform as described in the many embodiments illustrated herein. For example, as illustrated in some embodiments the upper body can be expanded to the near extremes of the platform and increase the volume of space within the passenger compartment. Such expansion can be supported by the modularity of the various embodiments described herein. Furthermore, the lower load path element, in many embodiments, can help to prevent passenger compartment penetration over a shortened distance from a shorter motor compartment. This can allow for a smaller overall footprint of a vehicle yet capitalize on the available space within that footprint and drastically improve the design capabilities of a body for the platform.

Figure 6G:
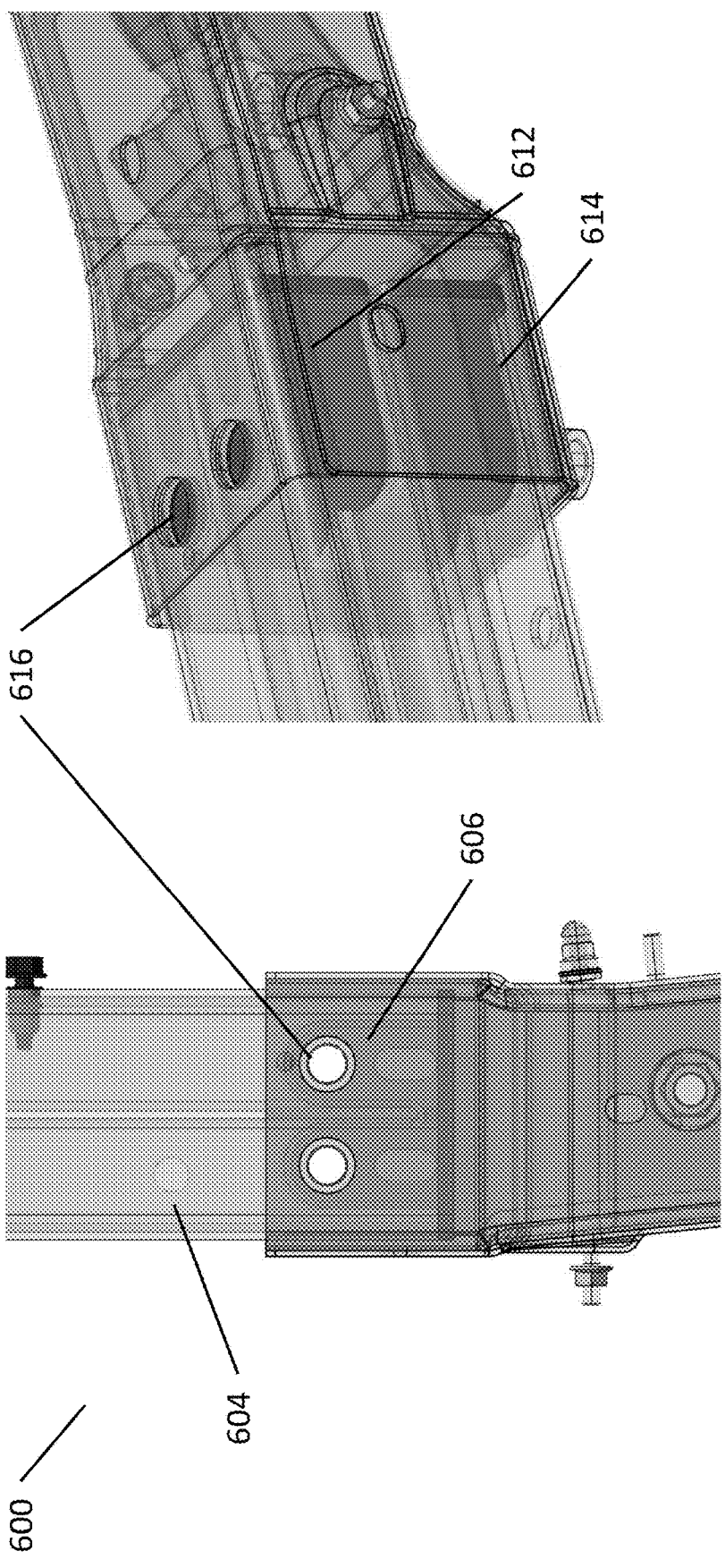

Turning now to FIG. 6G embodiments of a crush control element 606 can be seen within a lower load path. As described above, the crush control element 606 may be positioned within the lower load path 600 such that it aids in reducing the amount of compaction that the portions of the vehicle frame will ultimately see during impact. In many embodiments, the control element 606 is placed in an interface between the crush zone 604 and the bending element. As can be appreciated, some embodiments may incorporate an overlapping interface such that a portion of either the crush zone 604 or bending element cooperatively engages with the other. In many embodiments, the control element 606 may be placed within that engagement section.

Additionally, as previously discussed the length and/or size of the crush control element 606 can be adjustable to account for the variety of different vehicle configurations. For example, in some embodiments, the crush control element may be comprised of an upper 612 and a lower 614 component. Each of the upper 612 and lower 614 components can be configured to have a variety of designs that allow for reduced weight and improved strength in accordance with many embodiments. Additionally, many embodiments may incorporate one or more mounting holes 616 that run through the crush control elements such that the crush control element 606 can aid in securing the crush zone portion 604 to portions of the vehicle frame along the lower load path. In some embodiments, the crush control element 606 can be secured with bushings or bolts or any number of securing elements sufficient for the desired operation of the crush zone. It can be appreciated that the mounting method and/or position of mounting holes can vary depending on the configuration of the crush control element 606 and the overall desired impact resistance of the lower load path. It can be appreciated that various embodiments may use any number of materials and/or material combinations for the various elements of the lower load path structure such as metal, plastic, and/or composite.

Referring back to FIG. 5, many embodiments of the front zone of the frame 504 may, as previously described, have a variety of crash features or impact protection features. For example, the upper load path 545 may have crumple zone or crush components built into the various structural elements such as the upper front frame rails 532. Such elements can be essential to a frontal impact and having multiple crush elements can help to quickly absorb the energy from a frontal impact. However, as mentioned some impacts can occur at an offset to the front of the vehicle. As such, the IIHS performs offset crash tests to evaluate the impact on the passenger compartment. Accordingly, many embodiments may incorporate deflector elements (560 and 565) into the upper and lower load path components. The deflectors, according to many embodiments can absorb a portion of the impact along the load path but then act primarily to deflect the vehicle away from the primary direction of the impact. It is more desirable to limit the interaction with a shallow offset rigid barrier and disengage the vehicle from the barrier as quickly as possible. Therefore, many embodiments may implement a deflector system.

Figure 7:
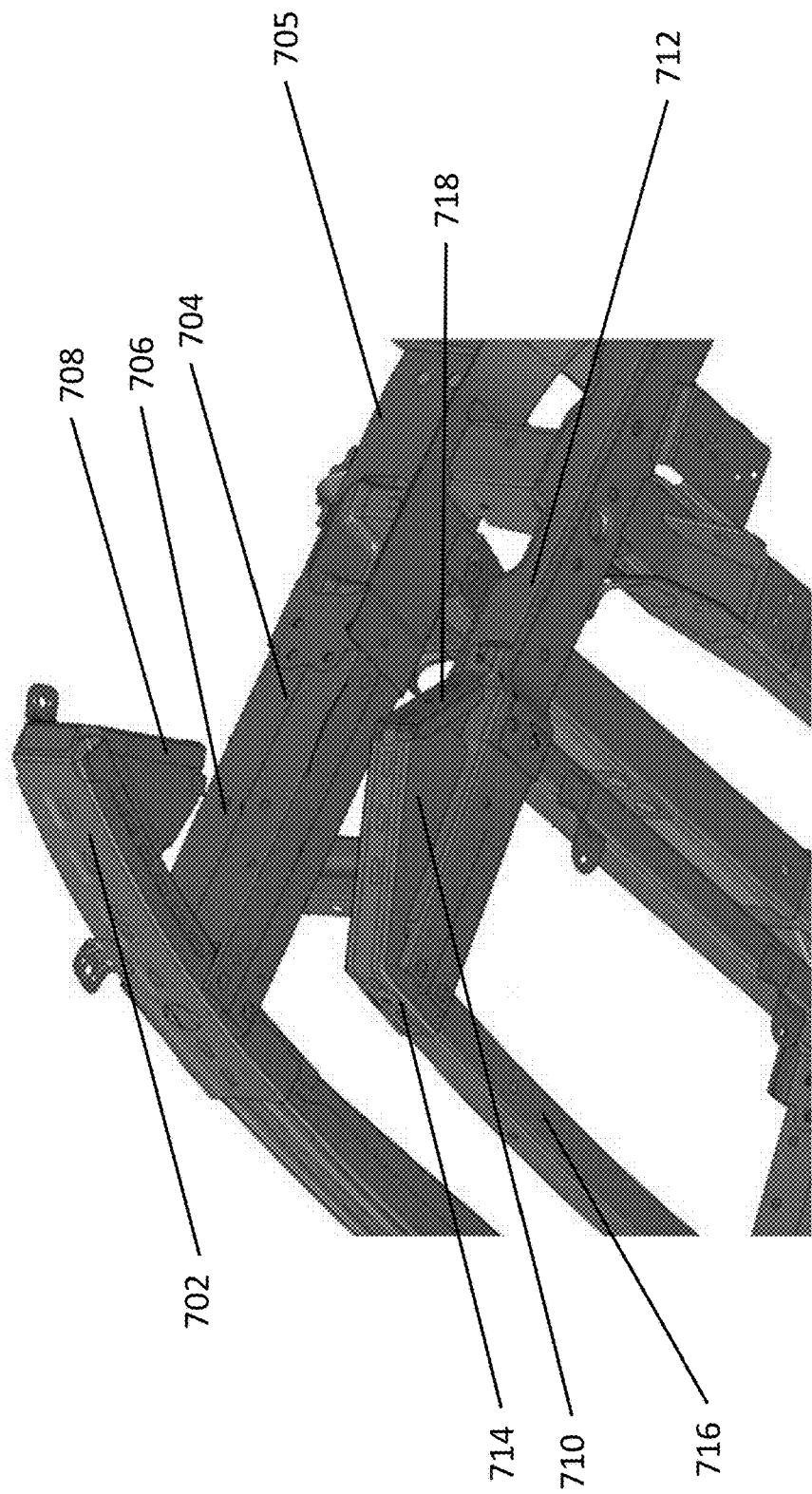
FIG. 7 illustrates a front deflector component in accordance with embodiments.

Referring now to FIG. 7, embodiments of a front portion of a framework for an electric vehicle platform can be seen. FIG. 7 illustrates a closer view of an embodiment of an upper and lower load path deflector 702. The upper deflector 702, in many embodiments, may be attached to and extend outward from an upper impact beam 704 or away from the centerline of the vehicle. In many embodiments, the upper impact beam 704 may be connected to a portion of the vehicle framework 705 by some type of fastening mechanism such as welding, bolts, or other suitable connector. It can be appreciated that many embodiments may use a removable fastener method to allow for the improved modularity of the design and further allow the upper impact beams to be removed or replaced if damaged or if a new vehicle design is desired. Additionally, the upper impact beam 704 may be configured to receive a number of different impact loads and in accordance with various embodiments may be designed to crush or crumple a certain distance and minimize the impact to the vehicle framework 705. Accordingly, similar to the lower load path element illustrated in FIGS. 6A-6G, embodiments of the upper load path may incorporate an upper crush control element that sits at an interface between the frame work 705 and the upper impact beam 704. It can be appreciated that various embodiments may use any number of materials and/or material combinations for the various elements of the upper load path structure such as metal, plastic, and/or composite In many embodiments, the upper deflector 702 can be contoured to match the body of the vehicle. As shown in FIG. 7 many embodiments may keep a space 706 between the outer portion of the upper deflector 702 and the upper impact beams 704. In some embodiments, this space 706 may be reduced by way of a spacer element 708. The spacer element 708 in many embodiments may be a rigid element that may be formed or attached to the upper deflector 702. The spacer 708 may take on any number of desired shapes such as a triangular shape as an example. The intent of the spacer is to allow for the impact energy from an offset impact to instigate a bending moment on the upper deflector to the point where the spacer influences the upper impact beams. Having absorbed some energy the impact between the spacer 708 and the upper impact beams 704 can then act to redirect the energy from the overall impact to deflect or push the vehicle away from the source of the impact such as a rigid barrier.

The upper deflector 702 in some embodiments may be designed to act in conjunction with the lower deflector 710. The lower deflector 710, in many embodiments, may be a rigid element that is attached to the lower load path impact beams 712. In many embodiments, the lower deflector 710 may have a pre-shaped portion 714 that engages with the front portion of the lower load path impact beam 712, may be connected with a front crossbeam 716, and may extend rearward and outward at an angle away from the front of the vehicle. In some embodiments, the lower deflector 710 may be attached to the lower load path impact beam 712 by way of a connection bracket 718. It can be appreciated that both the upper and lower deflectors 702 & 710 can be removed as needed. Additionally, in some embodiments the lower deflector may have a variety of different shapes that may coincide with the shape of the upper deflector 702. Many embodiments of the lower deflector may be designed to redirect the energy from an offset impact to push the vehicle off the impact source as quickly as possible. In many embodiments, the angle of the lower deflector may be parallel to the angle of the bent upper deflector. In other words, when the upper deflector 702 has been deformed or bent to the point in which the spacer 708 affects the upper impact beam, the brunt of any remaining impact force can then be directed to the lower deflector 710 and lower impact beam. Alternatively, when the lower deflector 710 is engaged first the upper deflector 702 can be configured to bend in conjunction with the contact. Once the engagement with the lower deflector is nearing completion, the upper deflector spacer 708 may contact the body elements and continue to deflect the vehicle. Pairing the angles of the upper and lower deflectors can help to quickly push the vehicle away from the source of impact smoothly between two separate but sequential pushes between the lower and upper deflectors. This can ultimately help to reduce the potential penetration into the passenger compartment. Although, a specific embodiment of deflectors is shown, it should be understood that the deflectors could be tuned to accommodate any number of impact loads that may be seen in accordance with any number of upper body component used. Additionally, in accordance with many embodiments, the impact components such as the spacer 708 and other deflector elements can be manufactured from any number of materials including metal, composite, carbon fiber, etc. Moreover, in many embodiments may have elements manufactured of materials similar to other portions of the framework. It should be appreciated that many embodiments of an electrical vehicle platform may incorporate one or more impact features described in relation to the front impact zone. It can be appreciated that various embodiments may use any number of materials and/or material combinations for the various elements of the upper and lower deflectors such as metal, plastic, and/or composite Referring back to FIG. 5, some embodiments may also incorporate additional crash or impact protection elements that may be incorporated into the rear and/or front frame rails (522 and 526 respectively). For example, referring now to FIGS. 8A and 8B, cross sectional views of a transition rail 800 is presented. The transition rail 800 may serve as a transition between the front/rear portions of the vehicle framework and the center section. In numerous embodiments of a vehicle framework structure, the transition rails 800 can be configured to absorb impact energy in a variety of ways. For example, some embodiments, as illustrated in FIG. 8A, may include a number of bulkhead elements (802, 804, 806, & 808) that are positioned central to the rail elements near a transition point 810 between the upper rail portion 812 and a mid-body rail portion 814. The transition element can be a predefined stress reducer to allow for some minimal compaction to allow impact energy to be transferred to the bulkhead elements. The bulkhead elements (802, 804, 806, & 808) may be positioned such that there is a space 816 between each of the bulkheads positioned in the transition region. The bulkheads, in accordance with many embodiments, can act as a stopping mechanism that reduces the bending or crumpling from an impact. For example, a frontal impact may cause a bending or crumpling to occur along the length of the rails. The bulkheads, in many embodiments can add strength and stiffness to the rails such that during the impact, the front and rear bulkhead can be designed to touch or connect by filling the space 816 between the bulkheads. This can aid in stopping or reducing the effects of the impact. Essentially, the bulkheads can help to control and reduce the intrusion into the passenger compartment. Although a certain spacing between the front and rear bulkhead elements is shown, it should be recognized that the spacing might be adjusted by any number of methods to accommodate a variety of impact loads. Accordingly, as the body of the vehicle changes the space as well can be adjusted.

As illustrated in FIG. 8A, the bulkheads may be comprised of multiple components. The front bulkhead may have two parts (802, 804) that are designed to cooperatively engage one with the other yet in the event of an impact the front two bulkhead elements (802, 804) may barely contact or not contact at all. In other embodiments, the two bulkhead components may be bonded together in such a manner that they remain in contact with each other before and during the impact. In some embodiments, the two front bulkhead components may have one or more flanges (818, 820) designed to overlap various interconnection points between the two components. For example, one or both may have a flange portion that overlaps a portion of the rail such that it may form a connection point between the bulkhead elements and the rails. Such attachment flanges may be present on both the front and the rear bulkhead elements. Although a specific design of the front and rear bulkhead elements is illustrated, it should be understood that the design, overlap, layout, connections, and/or material used for the bulkheads could vary in accordance with the safety requirements. Moreover, it can be appreciated that many embodiments may adjust the configuration, size, shape, and/or position of the bulkhead elements to account for any number of impaction loads. Similar to the other frontal impact elements, the use of bulkhead elements within the rails can help maintain desired safety requirements while taking advantage of the many characteristics of electric vehicles including maximizing the use of space in the passenger compartment.

Other embodiments may implement additional or modified bulkhead elements within the rails. For example, FIG. 8B illustrates a cross sectional view of rail elements with modified bulkhead components 822. Some embodiments may incorporate the transition point 810 or a bending point within the modified bulkhead. The bending point 810 may be an indentation within the rail and/or the bulkhead 822 or some other feature that is intended to allow for bending so as to transfer the impact load away from the main structure. In various embodiments, the modified bulkhead can extend between the upper and mid-body rails (812 & 814) thereby acting as a connection element that can serve as both a strengthening component as well as an impact absorption device within the rails. Some embodiments may also use a longitudinal bulkhead 824 that runs along a longitudinal axis of the rail. In other embodiments, the longitudinal bulkhead 824 may be placed in any one of the rails where a potential impact may occur. Moreover, although many embodiments exhibit vehicle impact features that may be included or omitted in vehicle platforms as described in the application, it will be understood that various combinations of such features may be used in any number of vehicle designs. Thus, it can be appreciated that many embodiments may utilize a variety of different bulkhead elements and bulkhead configurations to reduce the overall effects of a vehicle impact. It can be appreciated that various embodiments may use any number of materials and/or material combinations for the various elements of bulkhead support structures, such as metal, plastic, and/or composite The above-discussion has focused on highlighting the characteristic features of embodiments of front impact zones suitable for applications in a wide-variety of vehicle designs. In the sections that follow, focus will be placed on embodiments of specific configurations of rear and side impact safety components that may be implemented separately and in combination to achieve the desired functionality and safety performance.

Embodiments Implementing Rear Impact Zones

Referring back to FIG. 5 in relation to the overall frame of a vehicle platform, many embodiments have rear crush rails 533 and left and right rear frame rails 526 that are designed to absorb and/or deflect the energy from a rear impact. A rear impact can come from any number of events, including an oncoming vehicle while one is moving or stopped or the rearward movement into another moving or stationary object. Accordingly protecting the passenger compartment from rearward penetration can be just as important as from the front. This is especially true under the context of many embodiments of the vehicle platform that maximizes the occupant space. As previously mentioned, the maximization of space creates shorter front and rear drive train compartments that present unique challenges in designing adequate safety features. The forward and the rearward portions 504, 506 may in some embodiments be strengthened to provide increased safety but without the added weight that can dramatically affect the efficiency of the vehicle operation.

Figures 9A, 9B:
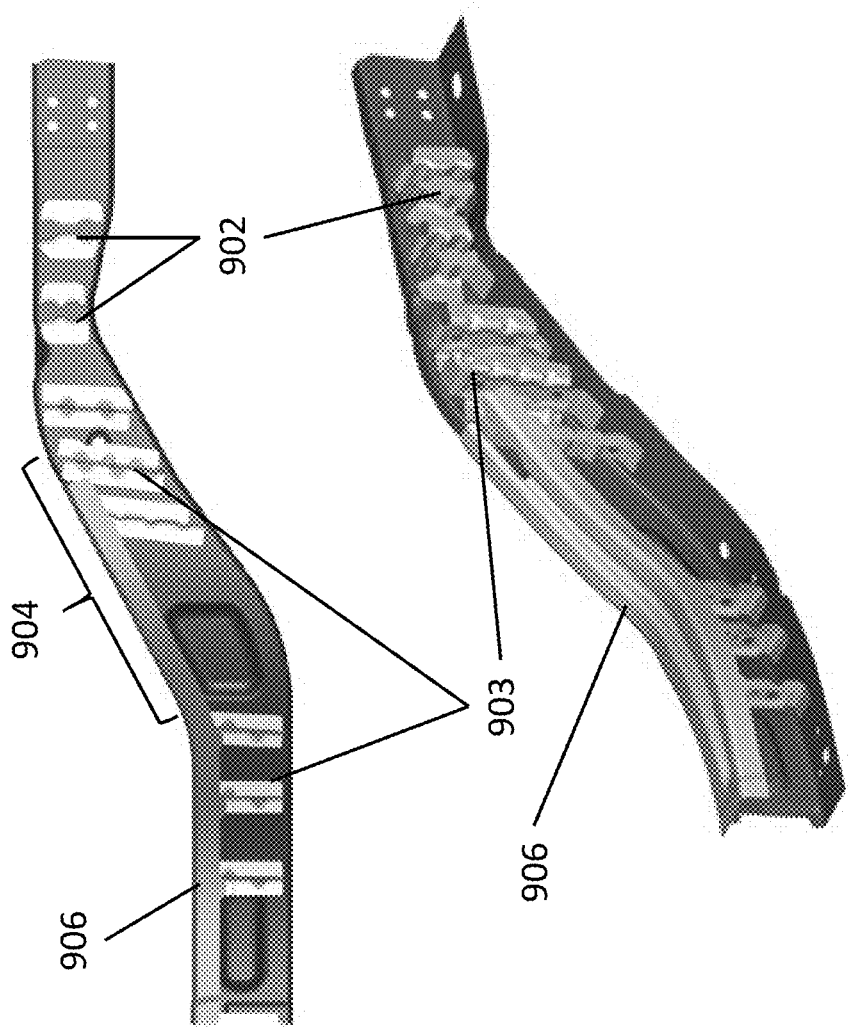
FIGS. 9A and 9B illustrate a rear portion of a vehicle platform framework in accordance with embodiments.

Referring now to FIGS. 9A and 9B an embodiment of the rear frame rails are illustrated in several cross sectional views. In some embodiments, it may be desirable to reduce the overall weight of the vehicle platform while maintaining the necessary strength to functional components of the overall vehicle. Some embodiments may incorporate multiple reinforcement bulkheads 902 along the length of the inner portion of the rear frame rails 900. The reinforcement bulkhead 902 according to embodiments can help to strengthen and stiffen the frame rails 900 in two different scenarios. First, the bulkheads 902 that may be positioned near the rear of the vehicle can be positioned such that they provide added stiffness and strength to the rails 900 to support the rear suspension system. Additionally, the rear most bulkheads can add stiffening material to help absorb impact energy from a rear impact. Likewise, the other bulkheads 903 that run forward along the length of the rear frame rail 900 may be positioned at various intervals to add strength and stiffness to the rear frame rail 900. The additional bulkheads, in accordance with many embodiments, can add additional strength and stiffness to the rear rails to minimize bending and compaction along the length of the rails during a rear impact. It can be appreciated from FIGS. 9A and 9B that the reinforcement bulkheads 902/903 may be positioned along the centerline of the rail 900 and may be sandwiched between an outer wall and an inner wall. Although a specific arrangement of bulkheads is illustrated, it can be appreciated that any configuration of bulkheads within the rear frame rail 900 may be used to strengthen and stiffen the rails without dramatically increasing the weight of the vehicle. In many embodiments, the bulkheads may be manufactured by a variety of methods including stamping, molding, casting, and/or forming both cold and hot. Likewise, the bulkheads may be made from any number of materials including metallic, carbon fiber, composite, etc. Furthermore, many embodiments may utilize a variety of combinations of bulkhead elements within the rail. For example some bulkheads may be concentrated within the rear most portion while other embodiments may place more emphasis in the undulation or central portion of the rail. This can allow for a wide range of impact scenarios to be considered and can allow for a wide range of vehicle configurations to be achieved.

The impact energy can be absorbed in any number of ways and through a variety of components during an impact. Therefore, as has been emphasized throughout, the protection of the passenger compartment is a key element in the safety features of a vehicle. Illustrated in FIGS. 9A and 9B the rear frame rails have an offset undulation 904 along the length of the rail 900. This can also be true for embodiments of the front portion of the vehicle as shown in FIG. 5. The undulation 904, in accordance with various embodiments, can help to increase the space in the passenger compartment while providing adequate space in the vehicle platform to support addition functional elements. However, the undulation 904 can create a stress point along the length of the frame rails 900 and may require additional stiffness. While traditional vehicles may add thickness to the rails, many embodiments of the platform may incorporate an overlapping reinforcement patch 906. The reinforcement patch 906 can act as a stiffener to the rail 900 in the event of a rear impact. In some embodiments, one or more reinforcement patches can be used to improve the overall strength of the undulation or offset. It can be further appreciated that the reinforcement patch 906 can have any number of configurations. For example, some embodiments may have one or more elongated patches. Additionally, various embodiments may vary the length of one or all of the reinforcement patches 906 to adjust the energy absorption capabilities of the rear impact zone.

Figure 10:
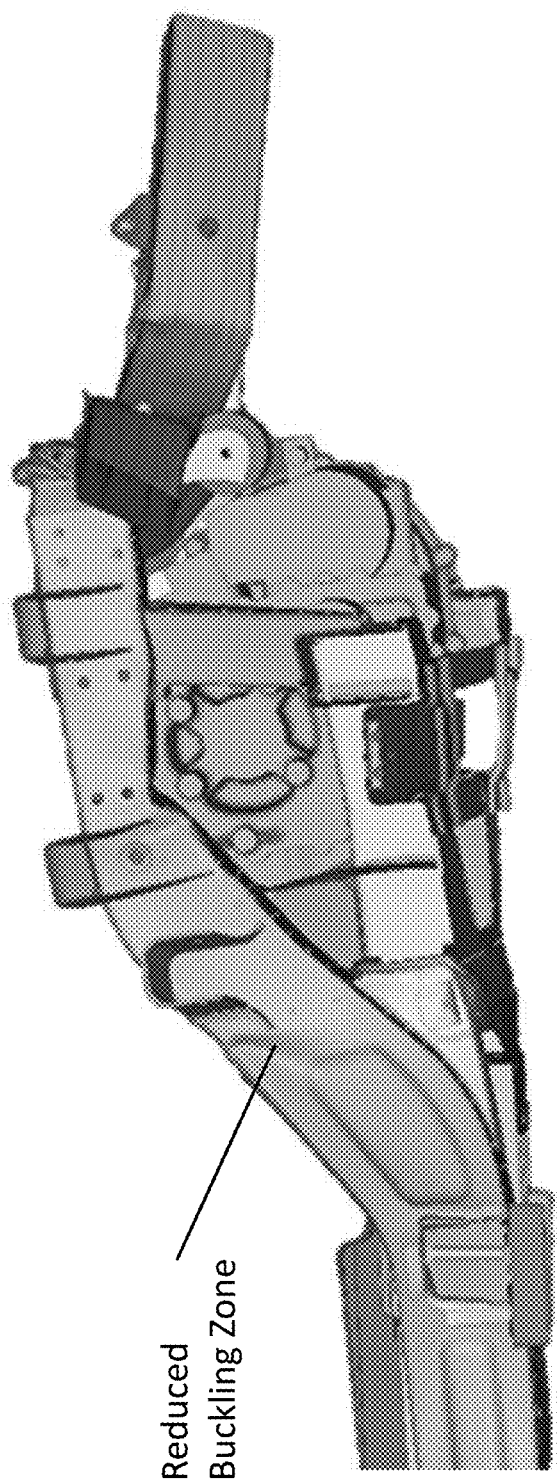
FIG. 10 illustrates a rear portion of a vehicle platform in accordance with embodiments expressing the post impact position of elements.

The added stiffness, in many embodiments can help prevent the rear drive train and other functional components from bending up and into the passenger compartment. Likewise, such patches can help to reduce the buckling seen by the rails in a rear crash. In accordance with many embodiments, the effectiveness of a reinforcement patch can be illustrated by FIG. 10. As shown, a small buckling zone or minimized buckling is illustrated in the undulation of the frame after a simulated rear impact. Such reduction in buckling is highly desirable with respect to prevention of damage to the passenger compartment. Many embodiments, function to improve impact energy absorption and thus reduce the effect of the impact on the passenger compartment. This helps to ensure a safer vehicle for the passengers. Moreover, although many embodiments exhibit vehicle impact features for the rear of the vehicle. It will be understood that various combinations of such features may be included or omitted as required by the specific vehicle design.

Embodiments of the Battery Compartment Impact Protection

Figure 11:
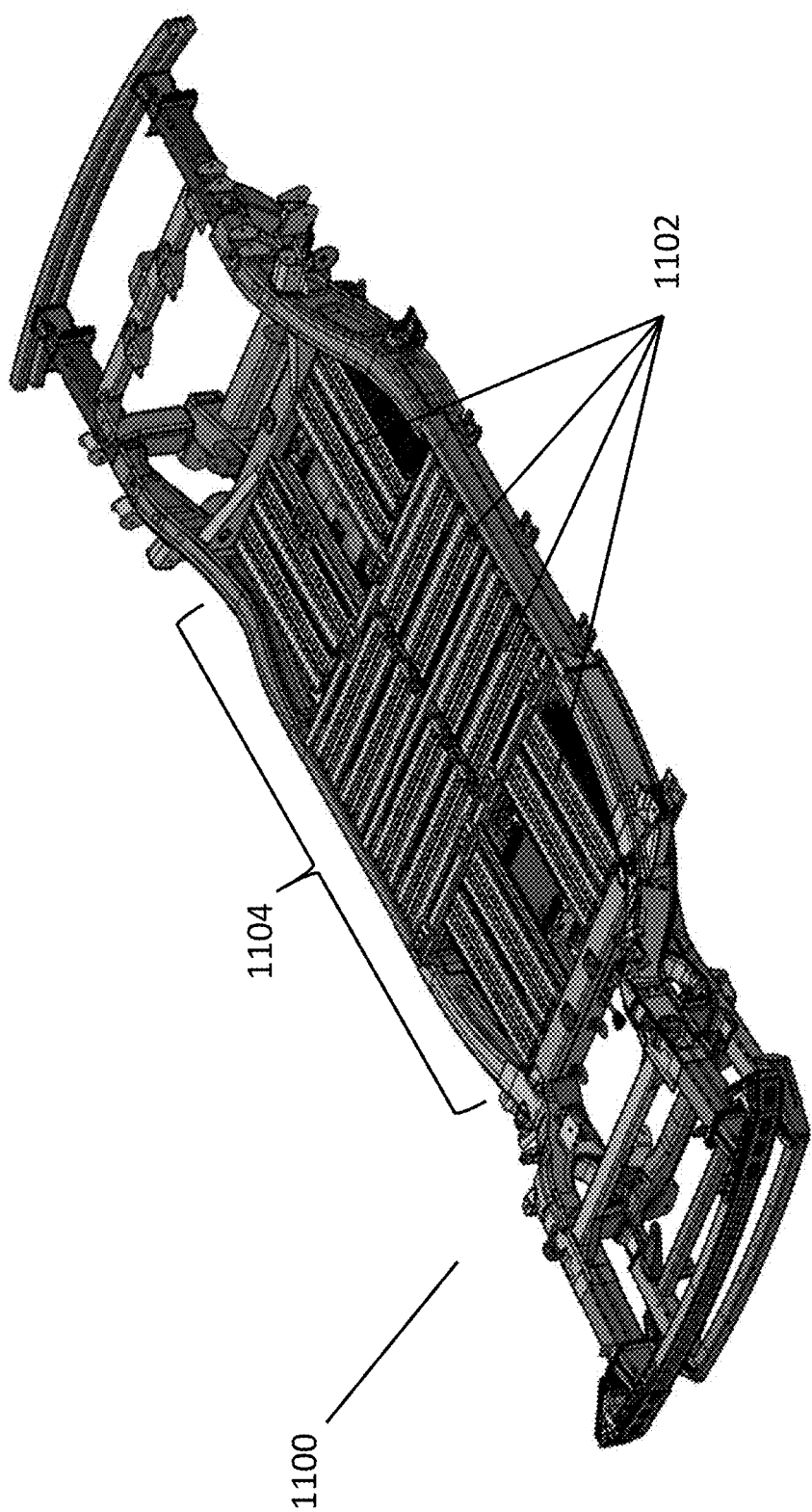
FIG. 11 illustrates a portion of a vehicle platform framework illustrating modular battery components in accordance with embodiments.

In addition to implementing impact control features in the front and rear of a vehicle, it can be of even higher importance to consider the potential for a side impact of a vehicle. As discussed above, in many embodiments of a vehicle platform, the battery compartment or energy storage compartment can be positioned in an interior space and can be vulnerable from side impact. Referring now to FIGS. 11 to 16, elements and components configured for the protection of the battery compartment in a vehicle platform are presented. FIG. 11 illustrates an electric vehicle platform fame 1100 with an energy storage system 1102 located on an interior space 1104 of the framework. Such placement, on the mid-point of the vehicle and at the vehicles lowest point is advantageous for a number of reasons. The energy storage system for most alternative fuel vehicles (whether pure electric or fuel cell) typically comprises a large proportion of the weight of the vehicle. By placing this heavy component mid-vehicle and as close to the ground as possible, the center of gravity of the vehicle is shifted closer to the road. This low center of gravity tends to improve the handling characteristics and roll over resistance of the vehicle. However, placing the energy storage system this close to the ground also creates potential hazards. In both fuel cell and battery, electric vehicles the energy storage components can combust if they are damaged, either during a collision or through impact resulting from a road hazard, such as penetration of an object into the containment vessel.

Figure 12:
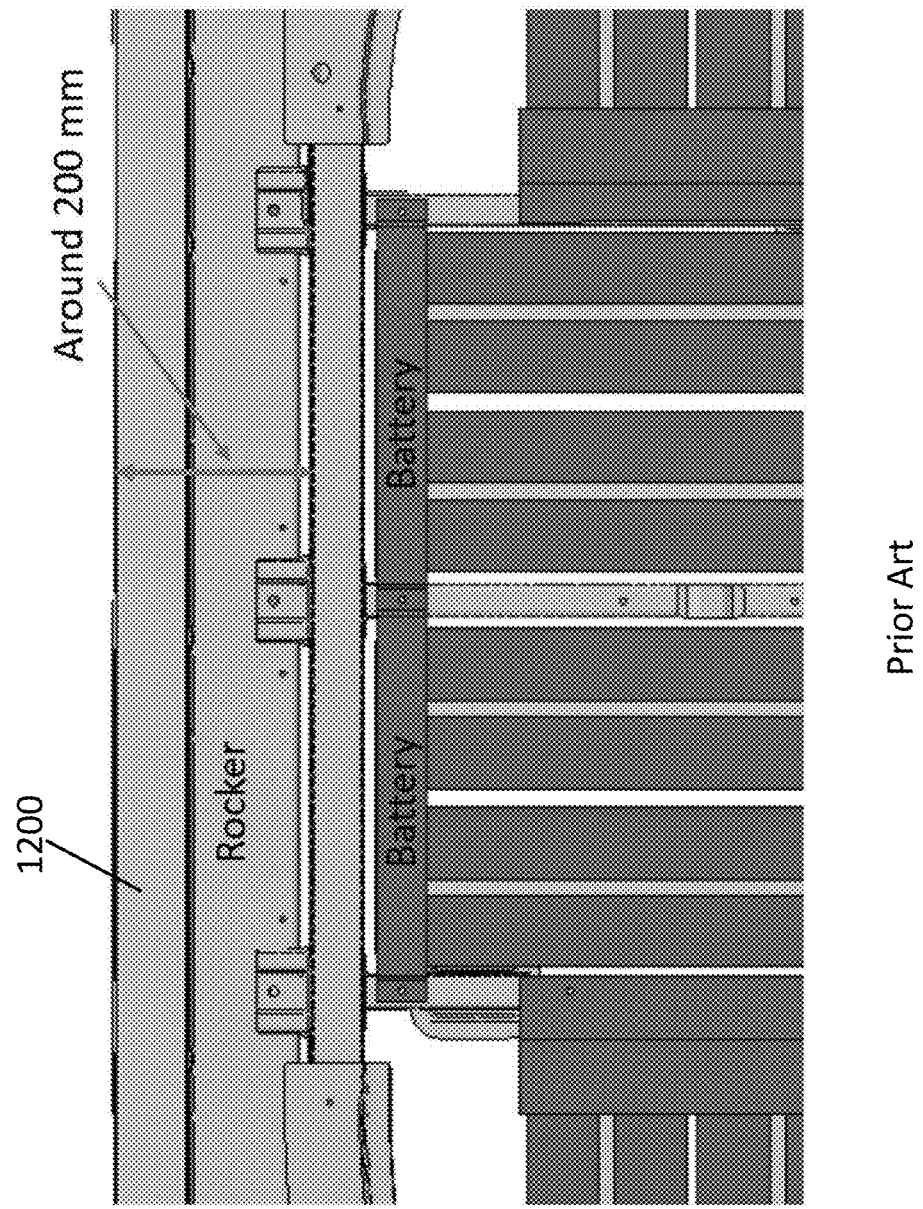
FIG. 12 illustrates a rocker panel enclosing a battery module in accordance with the prior art.

To address this issue, many electric vehicle manufacturers design energy storage systems as a monolithic pre-sealed unit, which is inserted into and separately sealed within a mid-body interior space of the frame. While this double hull construction does increase the force required to penetrate the battery compartment, and the frame of the energy storage system vessel may serve as a rigid lateral stabilizing element within the large open frame, the drawback is that inclusion of such a vessel into the vehicle adds greatly to the weight of the energy storage system, which ultimately can have a negative impact on vehicle range with minimal improvement to vehicle safety. Likewise, traditional electric vehicles may implement traditional impact absorption materials in and around the pre-sealed battery component. Additionally, some manufactures may add additional strengthening materials near or around the battery compartment. For example, FIG. 12 illustrates a view of a battery compartment with additional impact beams 1200 added to the rockers. These additional elements can help with side impact energy absorption; however, they also can add significant amounts of weight to the vehicle and reduce its efficiency.

Referring back to FIG. 11, an embodiment of a vehicle platform frame similar to FIG. 5 is illustrated. Specifically, FIG. 11 illustrated a vehicle platform frame with an energy storage system 1102 (e.g., a compartmentalized battery pack) disposed within the interior spaces of the mid-body space 1104 of the vehicle platform 1100. As previously discussed in relation to FIG. 5, the internal spaces of the vehicle platform can take on any number of configurations. Likewise, the placement of the energy storage system can have any number of configurations in accordance with many embodiments. Numerous embodiments may not incorporate a pre-sealed battery unit but rather modular units positioned within the framework of the vehicle platform such that any number of vehicle configurations can be achieved. Accordingly, many different embodiments of safety measures may be taken to keep the battery compartment sealed and protected in the event of an impact.

Figure 13:
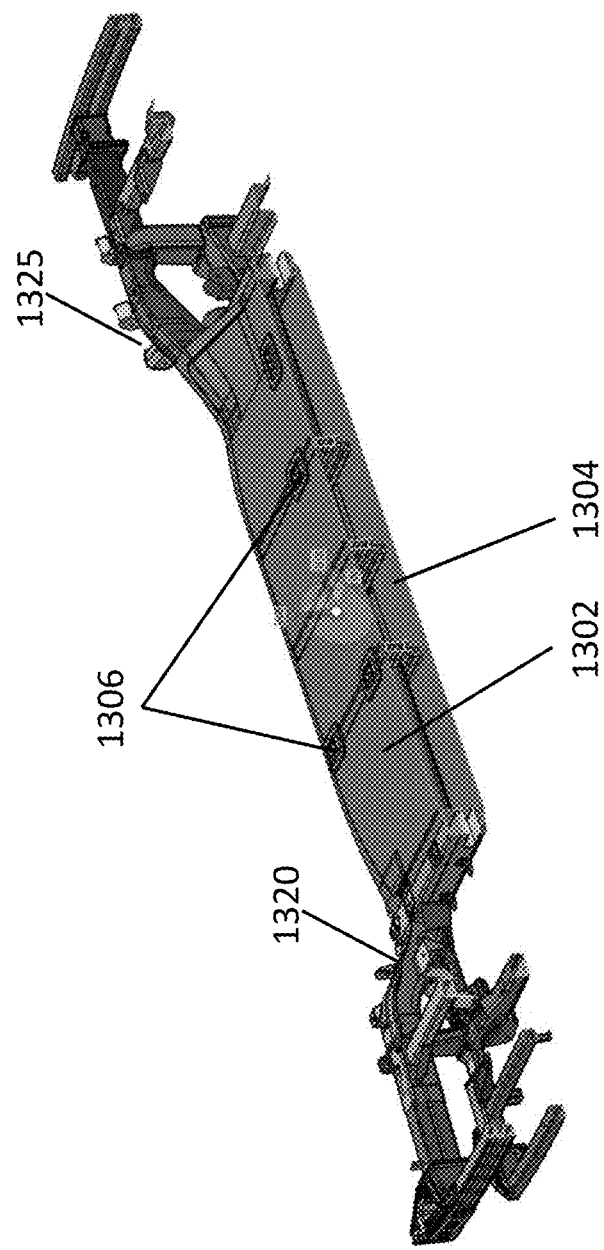
FIG. 13 illustrates a cross sectional view of a vehicle platform framework having a top and bottom to a battery compartment in accordance with embodiments.

In accordance with numerous embodiments, the battery compartment may be sealed using an upper plate 1302 and a lower plate 1304 as illustrated in the cross sectional view of the platform frame of FIG. 13. As can be appreciated in FIG. 13, the upper plate 1302 may be positioned between the front 1320 and rear 1325 rails and extend laterally across the vehicle platform. Although not fully discussed herein, the upper plate 1302 may be configured with a number of attachment points 1306 that can allow for a body or other upper components to be attached to the vehicle platform.

Figure 14:
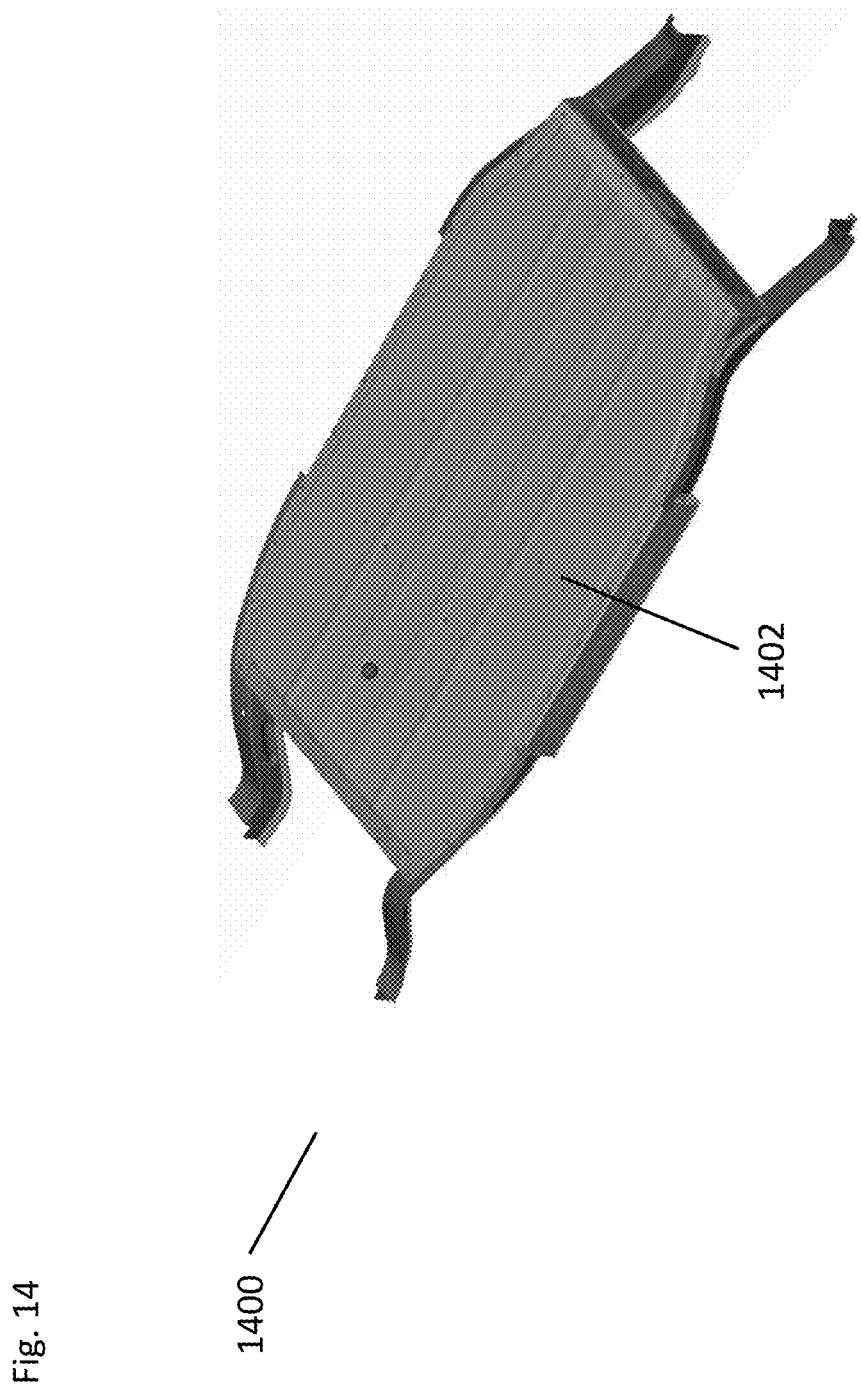
FIG. 14 illustrates a bottom view of a vehicle platform in accordance with embodiments.

Since many embodiments may position the battery compartment lower in the vehicle for various reasons, it can be necessary to ensure the protection of the battery compartment from the vehicle undercarriage. For example, FIG. 14 illustrates a view of a vehicle platform framework 1400 with a bottom cover plate 1402 connected to at least portions of the framework 1400. In addition, since the bottom cover plate 1402 serves as the only protection from intrusion of objects into the energy storage system space, additional safety features may be incorporated. The conventional approach is to install a bottom cover plate sufficiently thick to absorb the energy of an impact completely, however, this solution results in high mass penalties. Accordingly, various embodiments may employ a sacrificial shear panel/layer attached under the energy storage system compartment that is configured to shear off when the bottom cover plate 1402 is impacted, as illustrated in FIG. 14. In many such embodiments, the bottom cover plate 1402 may be formed of two or more plies of material bonded together. In such embodiments the bottom layer is configured to be a sacrificial layer that shears off the bottom cover plate when impacted resulting in minimal damage to the bottom cover plate.

The side impact of a vehicle is a significant safety concern in any vehicle design. However, in an electric vehicle, such impacts can present unique design challenges because the majority of such vehicles house the battery compartment near the bottom of the vehicle for various reasons previously discussed. Accordingly, not only is side impact a crucial consideration for passenger compartment penetration, it also presents an issue in preventing penetration into the battery compartment, as the battery elements have the potential to explode or ignite when damaged. As previously discussed, many electric vehicle manufactures use pre-sealed battery components and subsequently add bulky heavy additional material to the side portions of the frame. Referring back to FIG. 12, prior art illustrates additional material thickness in the rocker or side portion of the frame protecting the battery compartment. Such protection may be simply adding additional bulkhead supports within the rocker portion which are traditionally made of steel thereby adding to the weight and reducing the efficiency of the vehicle. Therefore, a lightweight solution would be needed to improve vehicle efficiency and maintain safety.

Figure 15A:
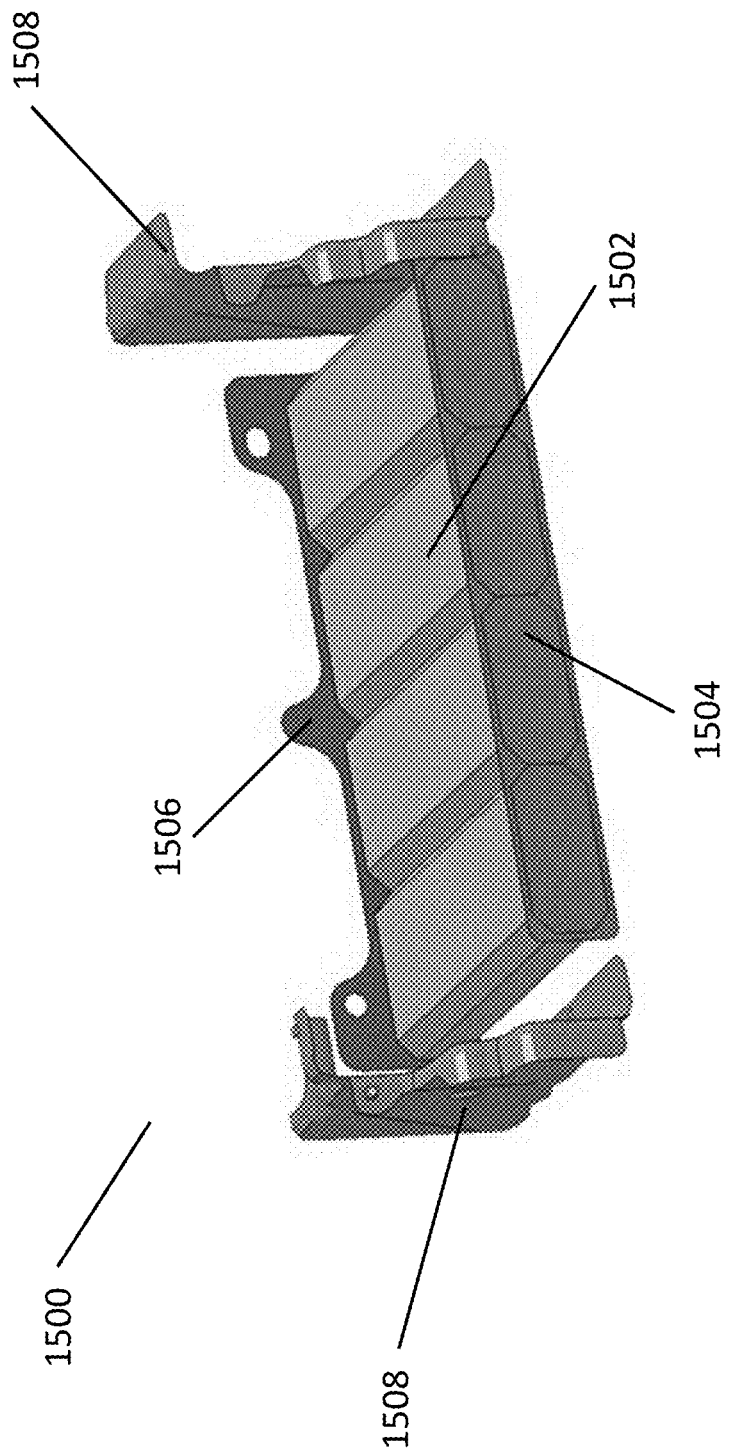
FIGS. 15A to 15C illustrate a modular side impact component in accordance with embodiments.

For example, FIG. 15A illustrates an embodiment of a side impact energy absorption unit that can help in reducing unnecessary bulk and weight in the overall design of the vehicle platform. In accordance with many embodiments, a vehicle may be configured with one or more modular energy absorption modules 1500 as illustrated in FIG. 15A. In accordance with many embodiments, the energy absorption module 1500 can be made up of various components that allow for the ease of installation, modulation, and improved side impact resistance. For example, in numerous embodiments of the module 1500, the main component may have one or more pre-designed crush cans 1502 that are contained between a front 1504 and a rear 1506 backing plate. Additionally, the module may be positioned between one or more bulkhead elements 1508 that can add additional impact resistance.

Figure 15B:
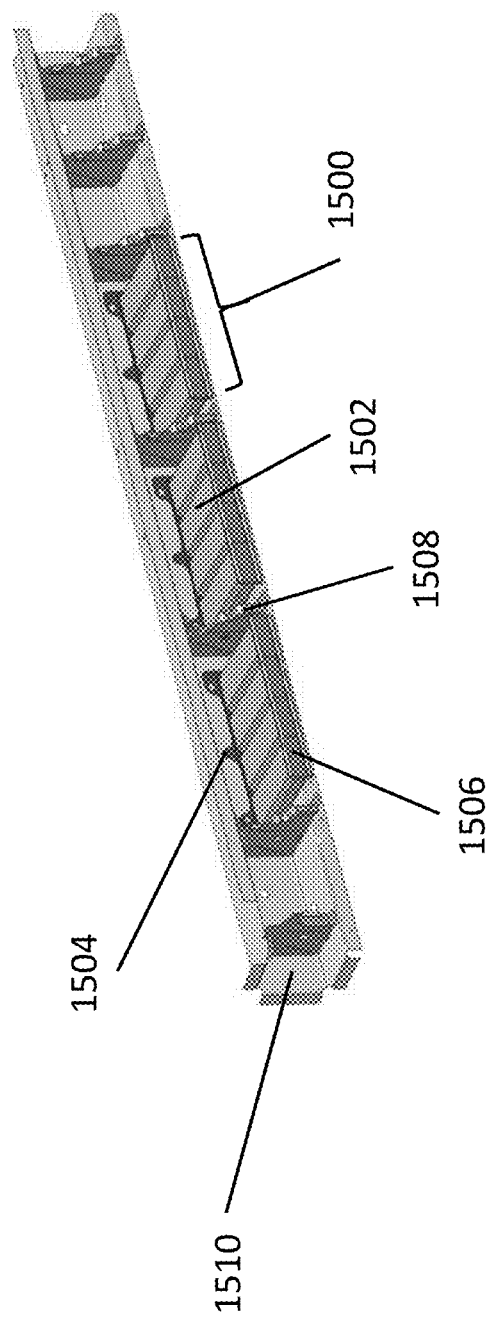
Figure 15C:
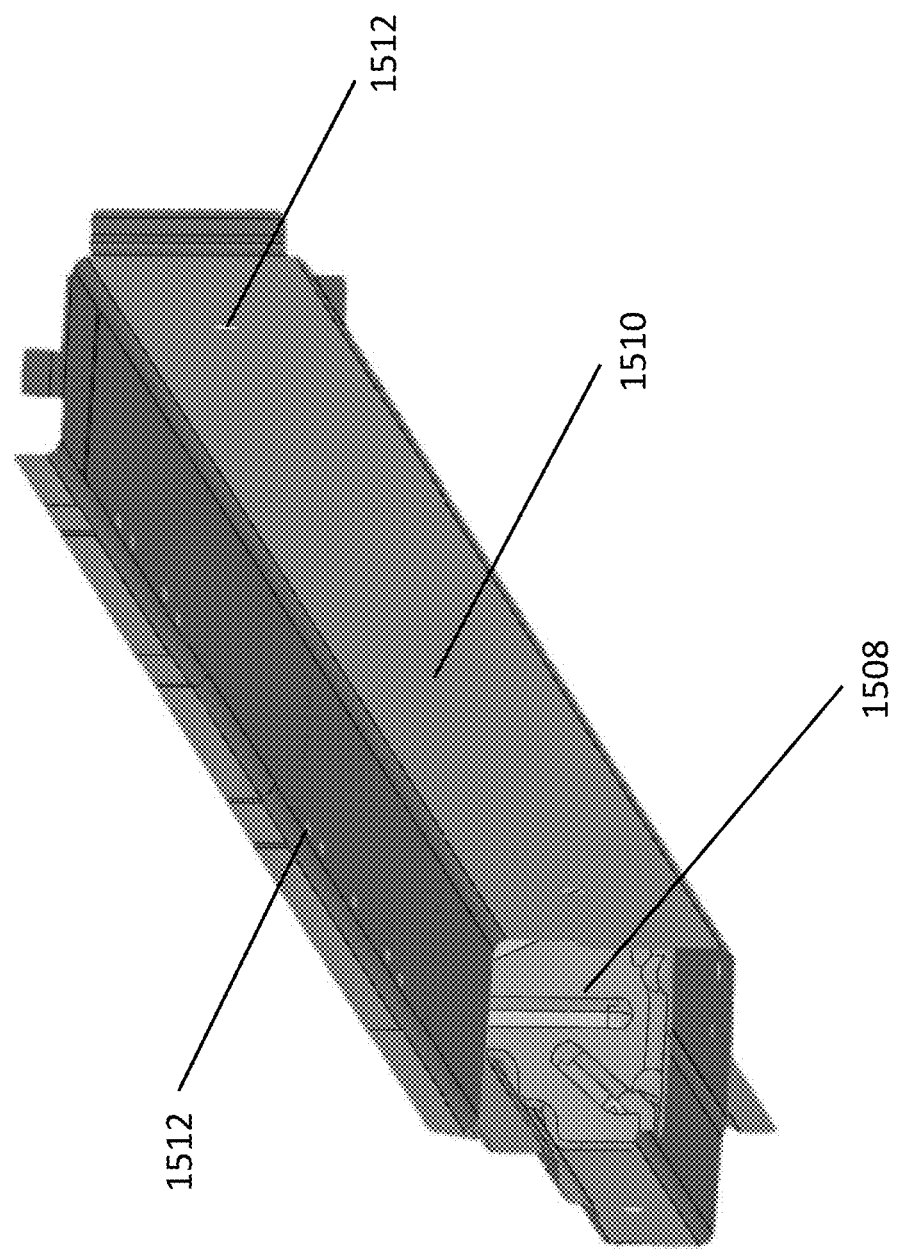

As can be appreciated the energy absorption module can be configured with multiple crush cans based on the overall design of the vehicle. For example, while the module 1500 shown in FIG. 15A has four crush cans 1502 displayed horizontally within a unit, the number of cans horizontally as well as vertically can be adjusted to accommodate a different level of energy absorption. Accordingly, the front 1504 and rear 1506 crush can backing plates could be modified to coordinate with the number of crush cans 1502 disposed between them. Additionally, the length of the crush cans can be tuned to the desired level of energy absorption, although some limits may apply based on the design of the selected body. Likewise, the thickness of the crush cans 1502 may be adjusted to be thinner or thicker depending on the level of impact resistance or compaction desired. Furthermore, as illustrated in FIG. 15A through 15C some embodiments may encapsulate the ends of the energy absorption unit with one or more bulkhead elements 1508. The tunability of the crush can elements in accordance with many embodiments can allow for the incorporation of various vehicle configurations while still maintaining the required level of safety and protection of the battery compartment.

As can be appreciated, the crush cans 1502 can be tuned in terms of cross sectional aspect ratio (length, width, height, as well as cross sectional shape), thickness, and size to accommodate a variety of safety levels or impact absorption levels. The ultimate goal of embodiments of the crush cans 1502 is to prevent the intrusion into the battery compartment while reducing the weight of the vehicle. Accordingly, many embodiments of the crush cans 1502 may be designed to withstand a certain force necessary to protect the battery compartment from penetration. Such embodiments may be configured to withstand a wide range of impact forces. Although some embodiments may be configured to such levels it should be understood that the crush cans 1502 can be tuned accordingly to any desired level of force compatibility.

Illustrated now in FIG. 15B is an embodiment of a pre-packaged energy absorption unit that has a plurality of energy absorption modules 1500 located within a generalized casing 1510. As previously mentioned, each of the energy absorption modules 1500 can contain multiple crush cans 1502 and subsequent elements surrounding the crush cans (1504, 1506, & 1508). In many embodiments, the casing 1510 can act as a housing that surrounds or partially surrounds the energy absorption modules 1500 as well as the additional support structures like the bulkheads 1508. Additional bulkheads 1508 can be placed along the length of the casing 1510 to provide additional strength and can also serve to reduce noise and vibration in the vehicle. Although a certain configuration is illustrated, it should be understood by the modular nature of the crush cans 1502 that any variation or configuration of crush cans 1502 and bulkheads 1508 could be used for the desired level of impact energy absorption. FIG. 15C illustrates an energy absorption unit in accordance with embodiments illustrating the full casing element 1510 around the bulkhead 1508 and crush can (not shown). It should also be understood that many embodiments of the casing 1510 can be outfitted with a number of attachment holes 1512 that allow for the ease of installation. This can be beneficial during the installation of the energy absorption units. Additionally, it can be appreciated that the attachment holes 1512 can provide for an improved maintenance process. Given the modularity of the side impact features, it can be appreciated that when an energy absorption unit is damaged it can be easily replaced with a new modular unit. Additionally, the modularity of the components means that only the damaged units will need to be replaced rather than all of the units.

The modularity of the unit increases the flexibility when embodiments of a vehicle incorporate a different body for the vehicle platform. For example, the vehicle can be configured with multiple energy absorption units, either along the length of the rocker or stacked vertically within the rocker(not shown) which can allow for any number of vehicle configurations to be obtained based on the desired body of the vehicle in accordance with many embodiments. Additionally, it should be understood that embodiments of the energy absorption unit might be manufactured from any number of materials including metal, such as aluminum or steel, composites, carbon fiber, etc. It can be largely appreciated that any such configuration could be used to accommodate the variety of vehicle bodies that may be used.

Figure 16:
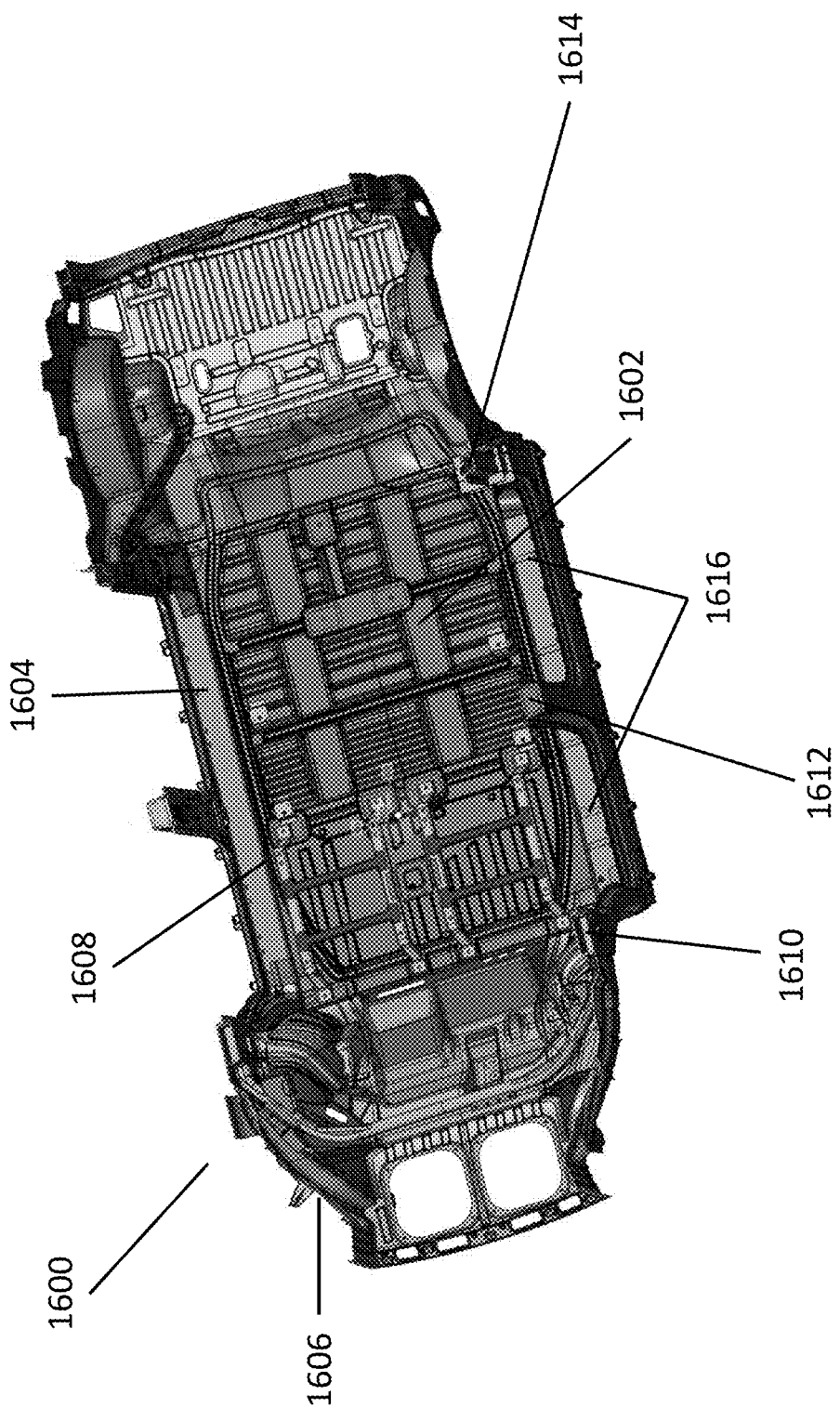
FIG. 16 illustrates a vehicle with side impact components in accordance with embodiments.

Turning now to FIG. 16 a cross section of an embodiment of a vehicle body platform 1600 giving view to the floor of the vehicle as well as the underlying frame is illustrated. Along both sides of the battery compartment 1602 an embodiment of a side impact energy absorption unit 1604 is provided. It can be seen that the energy absorption unit 1604 can be positioned between the body of the vehicle 1606 and the frame 1608 of the vehicle platform. Generally, the body of the vehicle 1606 may also incorporate other side impact features such as strengthened A, B, and C pillars (1610, 1612, 1614). Accordingly, many such embodiments may configure the energy absorption unit 1604 to be strengthened at each of those locations to provide some additional structural support to protect the passenger compartment as well as the battery compartment. To further illustrate this point several bulkhead elements 1616 are represented in one of the side energy absorption unit 1604. As previously mentioned, the side energy absorption units 1604 can be configured with multiple bulkheads 1616 and as discussed herein the bulkheads 1616 can be aligned with various other sections of the vehicle body for additional impact resistance. Additionally, the crush can modules (not shown) can be configured in any number of ways to fit between any number of bulkhead 1616 positions. The use of modular crush cans and an endless arrangement of bulkheads can help to reduce the amount of heavy material along the outer edges of a battery compartment and thus reduce the overall weight of the vehicle. Even though such elements can add to the total number of parts, the cost savings in weight reduction and vehicle efficiency can outweigh the complications created by increasing the number of parts for production.

Although many embodiments exhibit energy storage systems and associated safety components and structures within embodiments of vehicle platforms, it will be understood that various combinations of such systems and their structural and functional components may be included or omitted in any number of designs included the many embodiments of vehicle platforms as well as the associated impact safety features.

Summary & Doctrine of Equivalents

As can be inferred from the above discussion, the above-mentioned concepts can be implemented in a variety of arrangements in accordance with embodiments of the invention. Specifically, electric vehicles in accordance with embodiments are based on the idea of separating the lower structure of the vehicle (e.g., vehicle platform or skateboard) from the vehicle body (e.g., passenger cabin) to create a modular vehicle platform. The modularity of the vehicle body adds to the complexity of maintaining safety of the passengers and functional elements of the vehicle. Accordingly, many embodiments incorporate a number of different safety features that, similar to the platform and body, may be modular and adaptable in a number of configurations to maintain an overall desired level of safety for both the passengers and vehicle components.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A vehicle platform comprising:
a frame structure comprising multiple interconnected structural elements forming a body having a front portion, a rear portion, and a central portion; and
wherein the front portion comprises:
an upper load path comprising an upper energy absorption unit, the upper energy absorption unit comprising a first crush zone configured to compact relative to the front portion of the body while absorbing energy from an impact force; and
a lower load path comprising a lower energy absorption unit, the lower energy absorption unit comprising (i) a second crush zone configured to compact relative to the front portion of the body while absorbing energy from the impact force and (ii) a bending zone configured to bend and deflect subsequent energy not absorbed by the second crush zone,
wherein at least one of the upper energy absorption unit in the upper load path and the lower energy absorption unit in the lower load path comprises an overlapping interface that includes a tunable crush control element having a body coupled to a portion of the frame structure within the overlapping interface and configurable to crush a predetermined range from receipt of the impact force.

2. The vehicle platform of claim 1, wherein the lower load path comprises the tunable crush control element between the second crush zone and the bending zone, the tunable crush control element configured to control an amount of compaction that occurs in the second crush zone.

3. The vehicle platform of claim 1, wherein the upper load path comprises the tunable crush control element between the upper energy absorption unit and a portion of the frame structure.

4. The vehicle platform of claim 1, further comprising:
a lower deflection element extending outward and rearward from a front end of the frame structure at an angle such that the lower deflection element progressively diverges from the frame structure, the lower deflection element configured to deflect impact energy in a direction away from the frame structure.

5. The vehicle platform of claim 1, further comprising:
an upper deflection element extending outward from the frame structure, the upper deflection element configured to move inward towards the frame structure during an impact, the upper deflection element comprising a spacer configured to stop deformation of the upper deflection element by contacting a portion of the frame structure during the deformation.

6. The vehicle platform of claim 1, further comprising:
multiple support elements disposed within the frame structure, at least two of the support elements disposed within a front transition portion of the frame structure and configured to contact each during an impact.

7. The vehicle platform of claim 1, wherein the central portion is formed using at least a first lateral element and a second lateral element.

8. The vehicle platform of claim 1, further comprising:
at least one side impact energy absorption unit, each side impact energy absorption unit comprising:
an elongated casing element;
crush cans attached to a front backing plate and a rear backing plate such that the front and rear backing plates close off the crush cans, each of the front and rear backing plates attached to an inner surface of the elongated casing element; and
bulkheads disposed on at least one side of the crush cans and running parallel to the crush cans.

9. The vehicle platform of claim 1, wherein:
the interconnected structural elements comprise side rails; and
the rear portion comprises reinforcement patches disposed along the side rails and configured to reduce bending during a rear impact.

10. A vehicle comprising:
a vehicle body; and
a vehicle platform coupled to the vehicle body, the vehicle platform comprising:
a frame structure comprising multiple interconnected structural elements forming a body having a front portion, a rear portion, and a central portion; and
wherein the front portion comprises:
an upper load path comprising an upper energy absorption unit, the upper energy absorption unit comprising a first crush zone configured to compact relative to the front portion of the body while absorbing energy from an impact force; and
a lower load path comprising a lower energy absorption unit, the lower energy absorption unit comprising (i) a second crush zone configured to compact relative to the front portion of the body while absorbing energy from the impact force and (ii) a bending zone configured to bend and deflect subsequent energy not absorbed by the second crush zone,
wherein at least one of the upper energy absorption unit in the upper load path and the lower energy absorption unit in the lower load path comprises an overlapping interface that includes a tunable crush control element having a body coupled to a portion of the frame structure within the overlapping interface and configurable to crush a predetermined range from receipt of the impact force.

11. The vehicle of claim 10, wherein the lower load path comprises the tunable crush control element between the second crush zone and the bending zone, the tunable crush control element configured to control an amount of compaction that occurs in the second crush zone.

12. The vehicle of claim 10, wherein the upper load path comprises the tunable crush control element between the upper energy absorption unit and a portion of the frame structure.

13. The vehicle of claim 10, wherein the vehicle platform further comprises:
a lower deflection element extending outward and rearward from a front end of the frame structure at an angle such that the lower deflection element progressively diverges from the frame structure, the lower deflection element configured to deflect impact energy in a direction away from the frame structure.

14. The vehicle of claim 10, wherein the vehicle platform further comprises:
   an upper deflection element extending outward from the frame structure, the upper deflection element configured to move inward towards the frame structure during an impact, the upper deflection element comprising a spacer configured to stop deformation of the upper deflection element by contacting a portion of the frame structure during the deformation.

15. The vehicle of claim 10, wherein the vehicle platform further comprises:
   multiple support elements disposed within the frame structure, at least two of the support elements disposed within a front transition portion of the frame structure and configured to contact each during an impact.

16. The vehicle of claim 10, wherein:
   the central portion is formed using at least a first lateral element and a second lateral element.

17. The vehicle of claim 10, wherein the vehicle platform further comprises:
   at least one side impact energy absorption unit, each side impact energy absorption unit comprising:
      an elongated casing element;
      crush cans attached to a front backing plate and a rear backing plate such that the front and rear backing plates close off the crush cans, each of the front and rear backing plates attached to an inner surface of the elongated casing element; and
      bulkheads disposed on at least one side of the crush cans and running parallel to the crush cans.

18. The vehicle of claim 10, wherein:
   the interconnected structural elements comprise side rails; and
   the rear portion comprises reinforcement patches disposed along the side rails and configured to reduce bending during a rear impact.

* * * * *